US009715894B2

(12) United States Patent
Ostwald et al.

(10) Patent No.: US 9,715,894 B2
(45) Date of Patent: Jul. 25, 2017

(54) VERTICAL PASS-THROUGH FOR A DATA STORAGE LIBRARY

(71) Applicant: Oracle International Corporation, Redwood City, CA (US)

(72) Inventors: Timothy Craig Ostwald, Boulder, CO (US); Joseph Paul Manes, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/639,900

(22) Filed: Mar. 5, 2015

(65) Prior Publication Data

US 2015/0179210 A1    Jun. 25, 2015

Related U.S. Application Data

(63) Continuation of application No. 14/036,374, filed on Sep. 25, 2013, now Pat. No. 9,001,457.

(51) Int. Cl.
*G11B 15/68* (2006.01)
*B65G 1/02* (2006.01)

(52) U.S. Cl.
CPC ............ *G11B 15/682* (2013.01); *B65G 1/026* (2013.01); *G11B 15/6835* (2013.01)

(58) Field of Classification Search
CPC .... B65G 1/026; G11B 15/6835; G11B 15/682
See application file for complete search history.

(56) References Cited

U.S. PATENT DOCUMENTS

| | | | | |
|---|---|---|---|---|
| 3,831,197 A | * | 8/1974 | Beach ................ | G06K 17/0012 360/71 |
| 4,817,070 A | * | 3/1989 | Hug ...................... | G11B 19/02 369/30.39 |
| 4,855,980 A | * | 8/1989 | Hug ..................... | G11B 17/221 360/98.01 |
| 5,128,912 A | * | 7/1992 | Hug ..................... | G11B 17/225 360/99.02 |

(Continued)

*Primary Examiner* — Brian Miller
(74) *Attorney, Agent, or Firm* — Marsh Fischmann & Breyfogle LLP; Daniel J. Sherwinter

(57) ABSTRACT

Embodiments include systems and methods for providing throughput increase and/or physical expansion of a data storage library. Some embodiments include multiple robotic assemblies, each having its own hand assembly, which are electrically and mechanically integrated for concurrent use in a single storage library environment for increased throughput. Other embodiments include an active vertical pass-through assembly that operates to ferry cartridges from one storage library environment to another, vertically adjacent storage library environment. Some such embodiments use existing robotic mechanisms of the libraries to exploit a shared slot through which vertical pass-through functionality can be realized. Other embodiments include an active horizontal pass-through assembly that operates to ferry cartridges from one storage library environment to another, horizontally adjacent storage library environment. Some such embodiments include a separate robotic mechanism that couples with each library and actively passes a cartridge among them and is adjustable to varying spans between the libraries.

20 Claims, 18 Drawing Sheets

(56) References Cited

U.S. PATENT DOCUMENTS

| | | | | |
|---|---|---|---|---|
| 5,293,284 A * | 3/1994 | Sato | G11B 15/6835 | 360/92.1 |
| 5,481,514 A * | 1/1996 | Yamasaki | G11B 17/26 | 360/98.06 |
| 5,546,366 A * | 8/1996 | Dang | G11B 17/225 | 360/92.1 |
| 5,610,882 A * | 3/1997 | Dang | G11B 15/6835 | 360/92.1 |
| 5,631,785 A * | 5/1997 | Dang | G11B 15/6835 | 360/92.1 |
| 5,680,377 A * | 10/1997 | Dang | G11B 15/6835 | 360/98.04 |
| 5,700,125 A * | 12/1997 | Falace | G11B 15/6835 | 193/44 |
| 5,742,570 A * | 4/1998 | Taki | G11B 17/225 | 360/92.1 |
| 5,818,723 A * | 10/1998 | Dimitri | G11B 27/002 | 360/99.02 |
| 5,836,735 A * | 11/1998 | Yeakley | G11B 15/6835 | 414/226.05 |
| 5,940,356 A * | 8/1999 | Toumbas | G11B 17/225 | 360/92.1 |
| 6,041,026 A * | 3/2000 | Hammar | G11B 15/6835 | 360/92.1 |
| 6,059,509 A * | 5/2000 | Ostwald | G11B 17/24 | 414/277 |
| 6,068,436 A * | 5/2000 | Black | G11B 17/225 | 198/406 |
| 6,262,863 B1 * | 7/2001 | Ostwald | G11B 15/6835 | 360/92.1 |
| 6,309,162 B1 * | 10/2001 | White | G11B 17/225 | 360/98.05 |
| 6,327,519 B1 * | 12/2001 | Ostwald | G11B 15/6835 | 318/568.13 |
| 6,488,462 B1 * | 12/2002 | Williams | G11B 15/6835 | 198/375 |
| 6,496,325 B1 * | 12/2002 | Kersey | G11B 15/6835 | 360/92.1 |
| 6,690,994 B1 * | 2/2004 | Smith | G11B 15/6835 | 700/214 |
| 6,751,040 B2 * | 6/2004 | Gupta | G05B 19/4068 | 360/69 |
| 6,754,037 B1 * | 6/2004 | Ostwald | G11B 15/68 | 360/92.1 |
| 6,868,049 B2 * | 3/2005 | Ostwald | G11B 17/225 | 360/99.02 |
| 7,184,242 B1 * | 2/2007 | Ostwald | G11B 15/683 | 360/92.1 |
| 7,486,472 B2 * | 2/2009 | Pollard | G11B 15/6835 | 360/92.1 |
| 7,525,756 B2 * | 4/2009 | Nave | G11B 15/689 | 360/92.1 |
| 8,031,563 B2 * | 10/2011 | Iwata | G11B 15/6835 | 360/99.07 |
| 9,001,457 B1 * | 4/2015 | Ostwald | G11B 15/6835 | 360/92.1 |
| 2003/0113193 A1 * | 6/2003 | Ostwald | G11B 15/6835 | 360/92.1 |
| 2005/0065637 A1 * | 3/2005 | Lantry | G06F 3/0611 | 360/92.1 |
| 2007/0131630 A1 * | 6/2007 | Thorn | G11B 15/6825 | 211/41.12 |

* cited by examiner

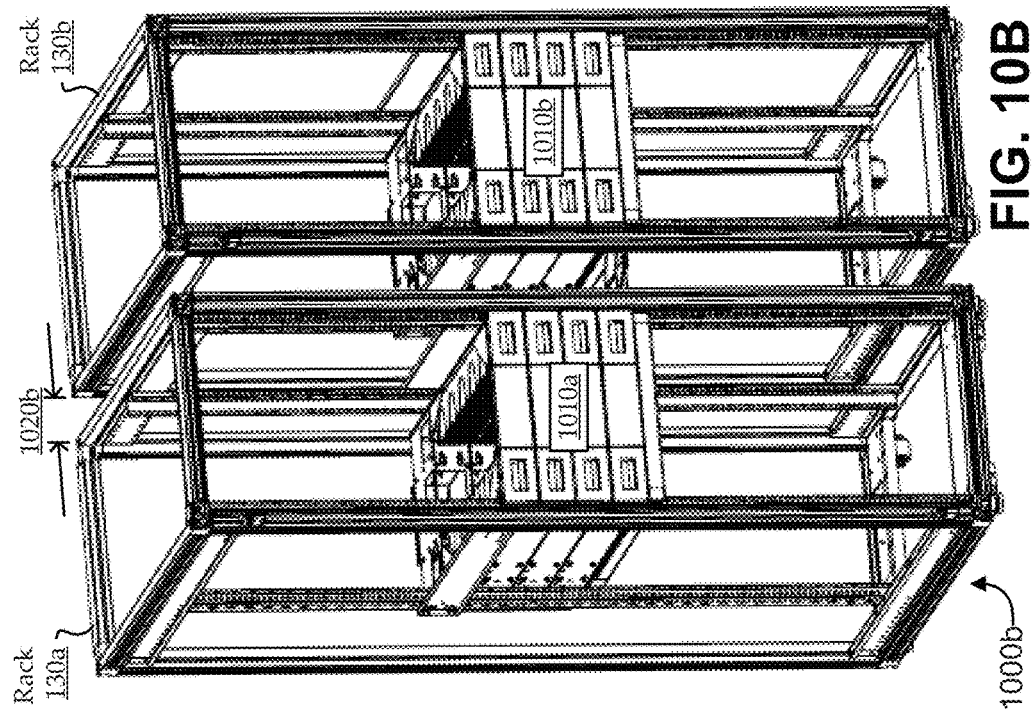
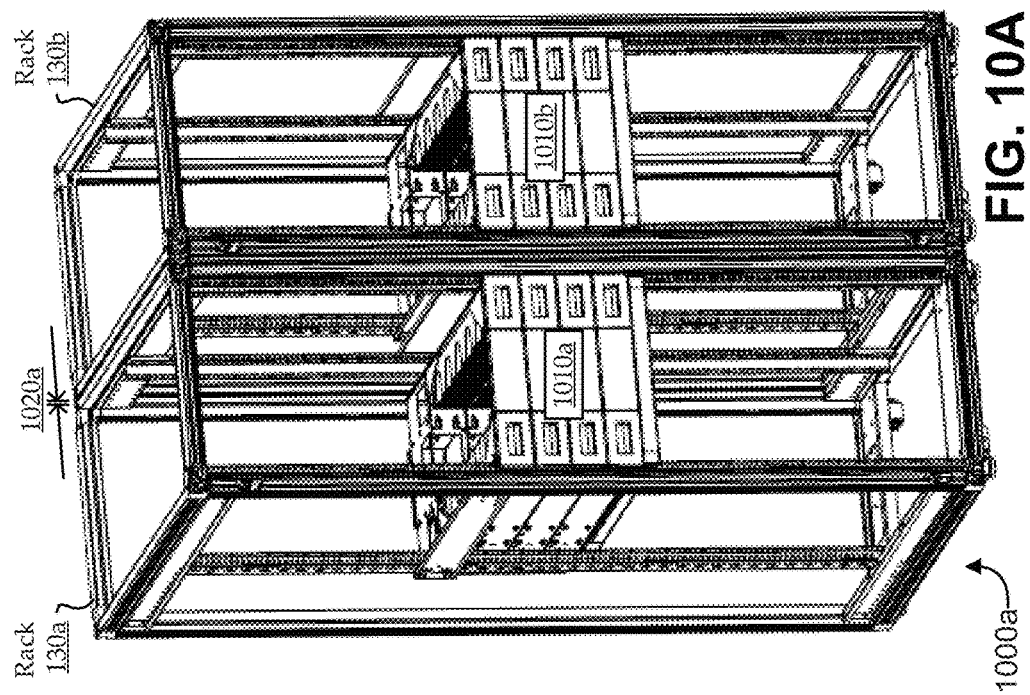

VERTICAL PASS-THROUGH FOR A DATA STORAGE LIBRARY

FIELD

Embodiments relate generally to data storage systems, and, more particularly, to scaling storage libraries by using multiple robotic assemblies and/or pass-throughs.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (JO) operations on multiple cartridges.

One limitation of some such storage library systems is that the throughput of the system (e.g., how quickly data can be accessed) is at least partly dependent on physical constraints relating to moving the robot, picking and placing cartridges, etc. For example, expanding the size of the library can effectively increase the distances traversed by the robot when performing pick and place operations, and the like, which can thereby increase access times and reduce throughput. Another limitation of some such storage library systems is that a fixed number of cartridges fit in the library. For example, if a library is intended to fit in half of a standard equipment rack, that overall footprint can drive the space available for cartridges, magazines, etc. To use more cartridges, customers typically purchase an additional library that operates independent of the other library.

BRIEF SUMMARY

Among other things, systems and methods are described for providing throughput increase and/or physical expansion of a data storage library. Embodiments operate in context of a data storage library having a number of media cartridges physically located within slots of one or more magazines. A robot with a hand assembly uses a gripper mechanism to retrieve and ferry the cartridges between the magazines and one or more media drives. Some embodiments include multiple robotic assemblies, each having its own hand assembly and gripper mechanism, which are electrically and mechanically integrated in a manner that allows for concurrent use of the two robots in a single storage library environment for increased throughput. For example, as one robotic assembly locates a first cartridge and ferries it to a designated media drive, another robotic assembly locates a second cartridge and ferries it to a second media drive.

Other embodiments include an active vertical pass-through assembly that operates to ferry cartridges from one storage library environment to another, vertically adjacent storage library environment. For example, a first storage library installed in a top half of an equipment rack can be coupled with a second storage library installed in a bottom half of the equipment rack via the vertical pass-through, so that cartridges can be passed between the two libraries. Implementations of the vertical pass-through assembly use the robotic assembly of one library to actively pass cartridges to a slot in the other library, where they can be picked up by the robotic assembly of the other library.

Other embodiments include an active horizontal pass-through assembly that operates to ferry cartridges from one storage library environment to another, horizontally adjacent storage library environment. For example, a first storage library installed in a first equipment rack can be coupled with a second storage library installed in a second equipment rack via the horizontal pass-through. The robotic assembly of one library can place a cartridge in a slot of the horizontal pass-through, and the horizontal pass-through can actively ferry the cartridge to the other library, where the cartridge can be picked up by the robotic assembly of the other library. Implementations of the horizontal pass-through assembly are expandable to fit multiple horizontal separations between libraries.

BRIEF DESCRIPTION OF THE DRAWINGS

The present disclosure is described in conjunction with the appended figures:

FIGS. 10A and 10B show storage library environments, each having storage libraries on respective, horizontally adjacent equipment racks;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
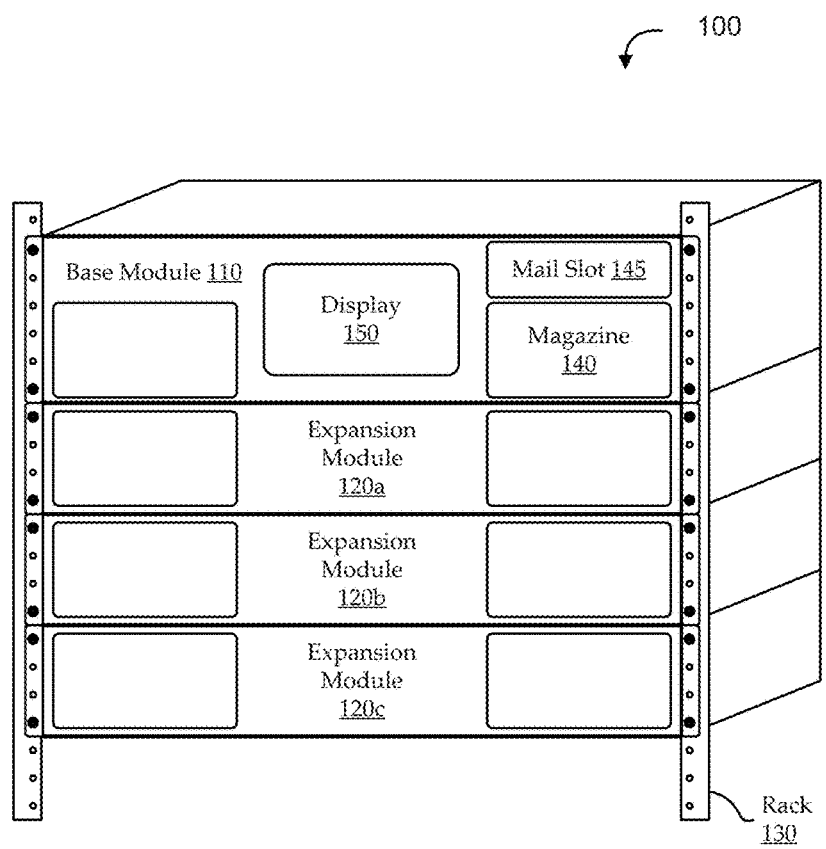
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

Figure 2A:
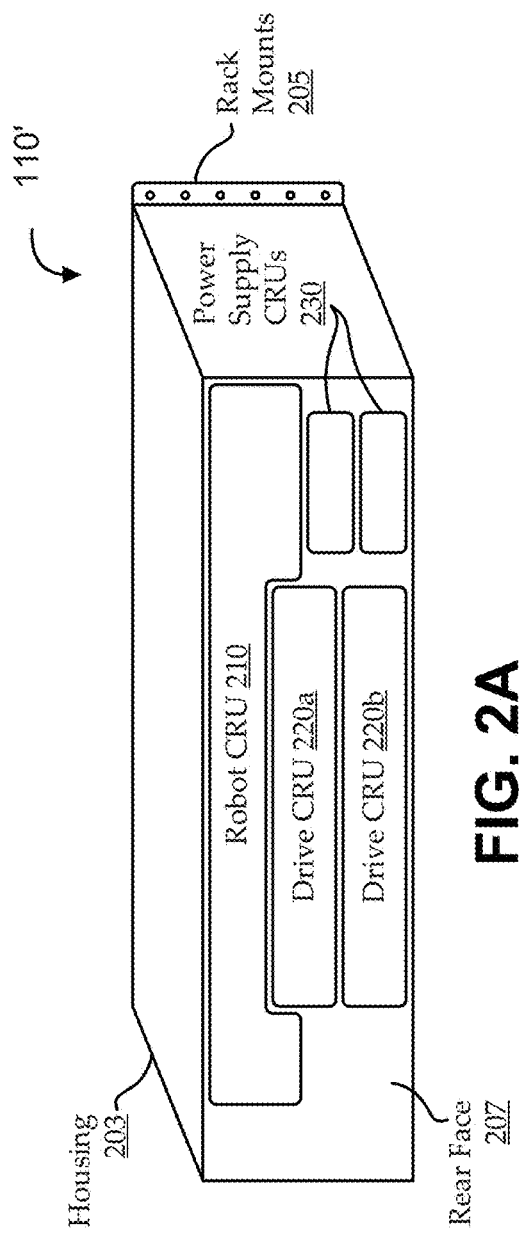
FIGS. 2A and 2B show rear and front views, respectively, of an illustrative base module, according to various embodiments.
Figure 2B:
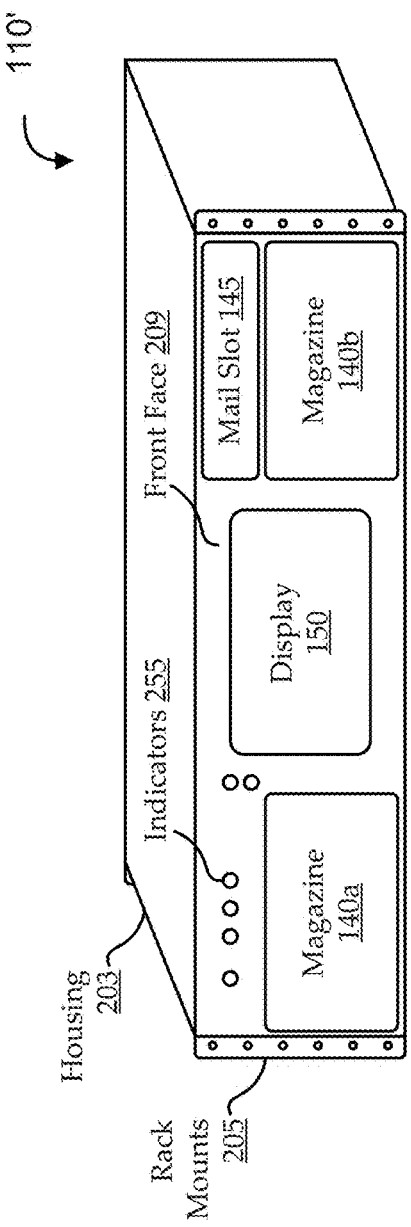

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

Figure 3A:
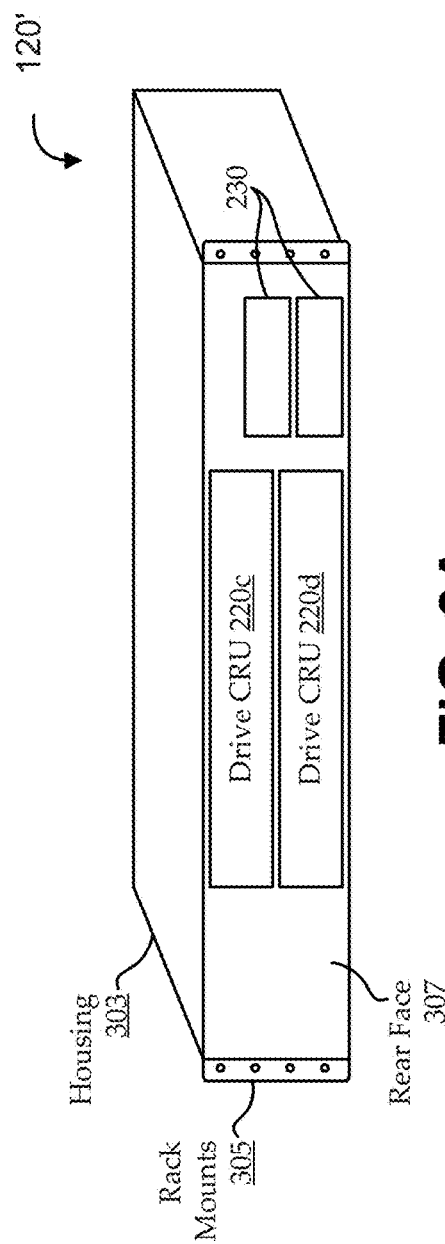
FIGS. 3A and 3B show rear and front views, respectively, of an illustrative expansion module, according to various embodiments.
Figure 3B:
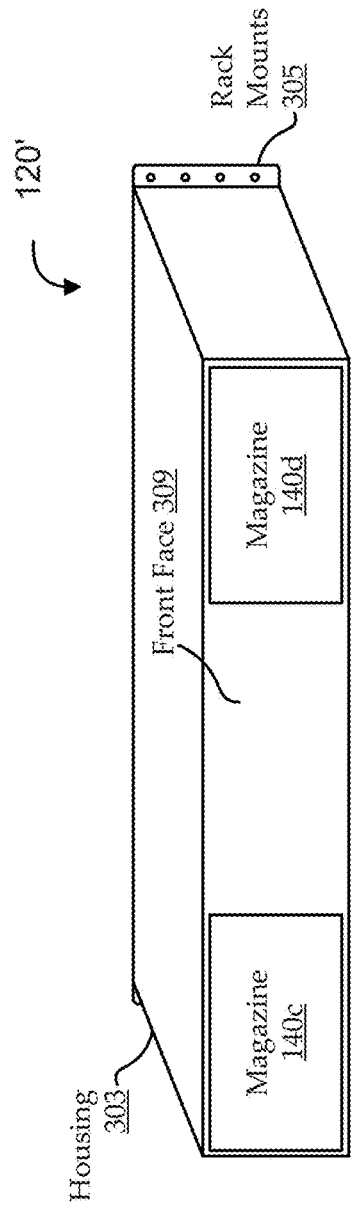

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
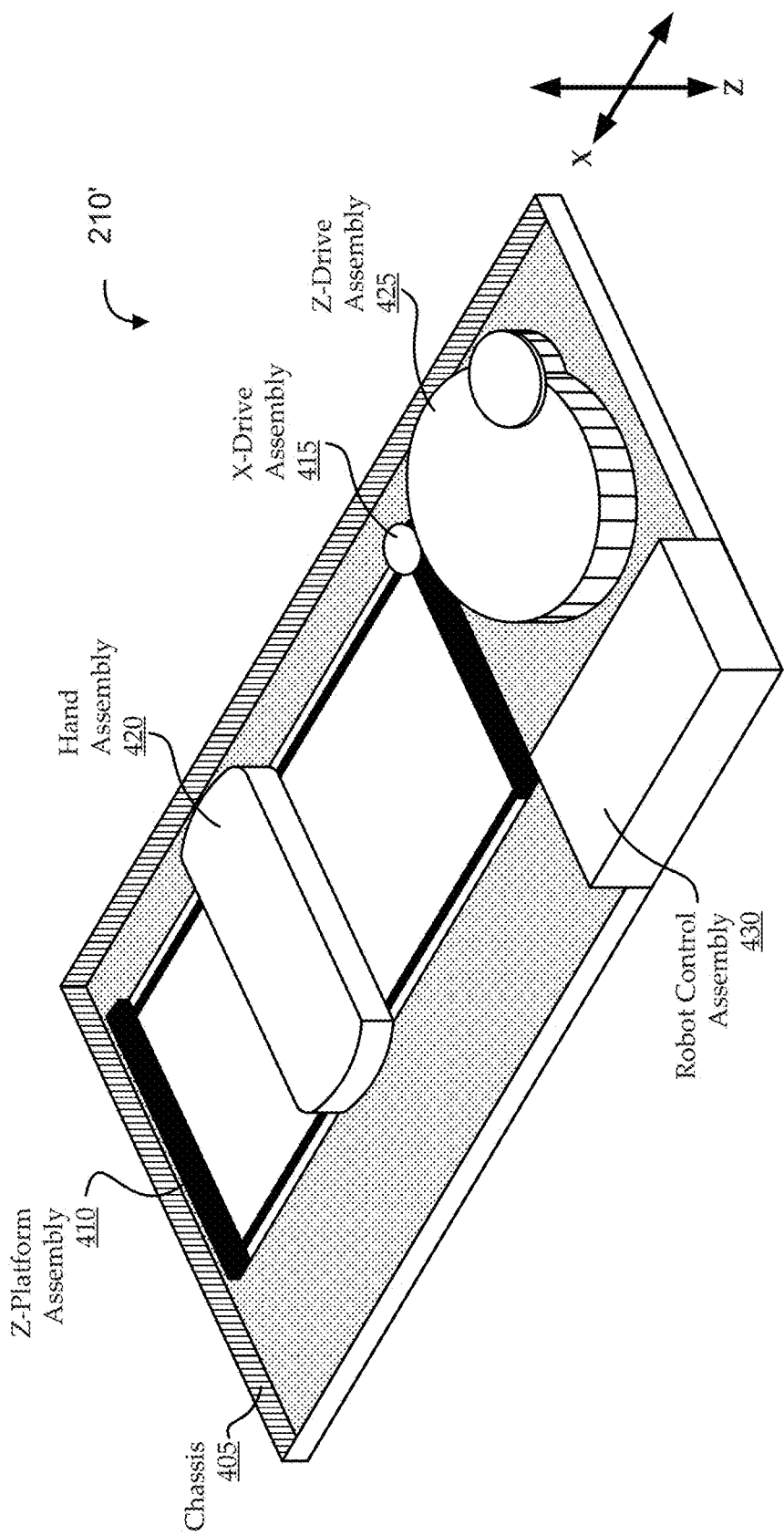
FIG. 4A shows a view looking down on the underside of an illustrative robot CRU (customer replaceable unit), according to various embodiments.
Figure 4B:
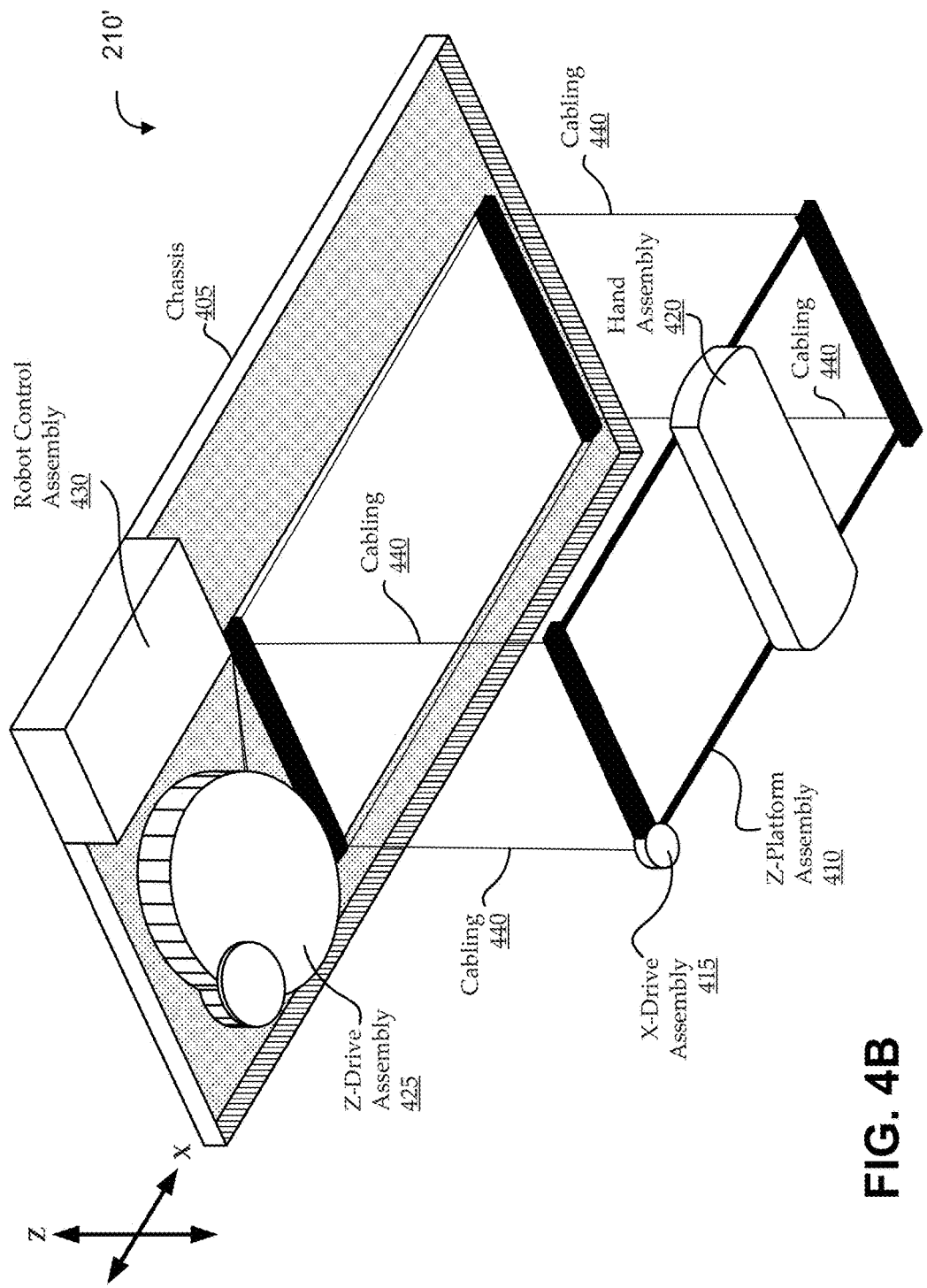
FIG. 4B shows another view looking up at the underside of an illustrative robot CRU with the Z-platform assembly partially lowered, according to various embodiments.

The embodiments of storage library systems and components described above are intended to provide clarity to the invention and some illustrative implementations. Modifications can be made without departing from the scope of inventions. For example, certain logical (e.g., throughput) and/or physical (e.g., pass-through) expansion functionality involves modifications to the storage library configurations. Further, much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only on possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (as used herein, the +Z direction is up towards the home position in the robot CRU 210, and the −Z direction is down towards the bottom-most magazine slots of the bottom-most expansion module 120') and an "X" direction (as used herein, the +X direction is towards the front side of the base module 110' or expansion modules 120', and the −X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism (not shown) that provides motion in a yaw direction (i.e., around the Z-directional axis). Some embodiments of the hand assembly 420 further provide radial movement from the Z-directional axis. For example, a grabber mechanism can "reach out" in a radial direction that is determined by the yaw (rotational) orientation provided by the wrist mechanism.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned (e.g., using a wrist mechanism) to a desired rotational orientation (e.g., to face a cartridge slot or a media drive, to provide a desired angle for use of a sensor, etc.). If desired, a gripper mechanism may then be used to reach out (i.e., radially) from that X-Z-position and rotational orientation (e.g., to grab or release a cartridge). Some implementations of hand and gripper mechanisms are described in U.S. patent application Ser. No. 13/348,486, filed on Jan. 11, 2012, titled "Ratcheting Gripper for a Storage Library," which is hereby incorporated by reference in its entirety.

Multi-Robot Embodiments

Performance of various cartridge operations, such as pick-and-place operations, inventory and auditing operations, and the like, involve moving the hand assembly 420 to one or multiple desired locations. For example, placing a cartridge into a media drive can involve moving the hand assembly 420 to the slot location of the cartridge in a magazine, picking the cartridge from the slot (e.g., by extending the gripper mechanism to engage with the cartridge and retracting the gripper mechanism with the cartridge engaged), moving the hand assembly 420 with the engaged cartridge to the media drive location, and placing the cartridge in the drive (e.g., by extending the gripper mechanism to disengage with the cartridge in the drive slot and retracting the gripper mechanism without the cartridge). Each of these stages involves movement of the hand assembly 420 and takes a discrete amount of time. Accordingly, the throughput of the media library can be limited at least in part by the time it takes to move the hand assembly 420 to each location. In some embodiments, multiple robotic mechanisms are used concurrently, each with its own hand assembly 420.

Figure 5:
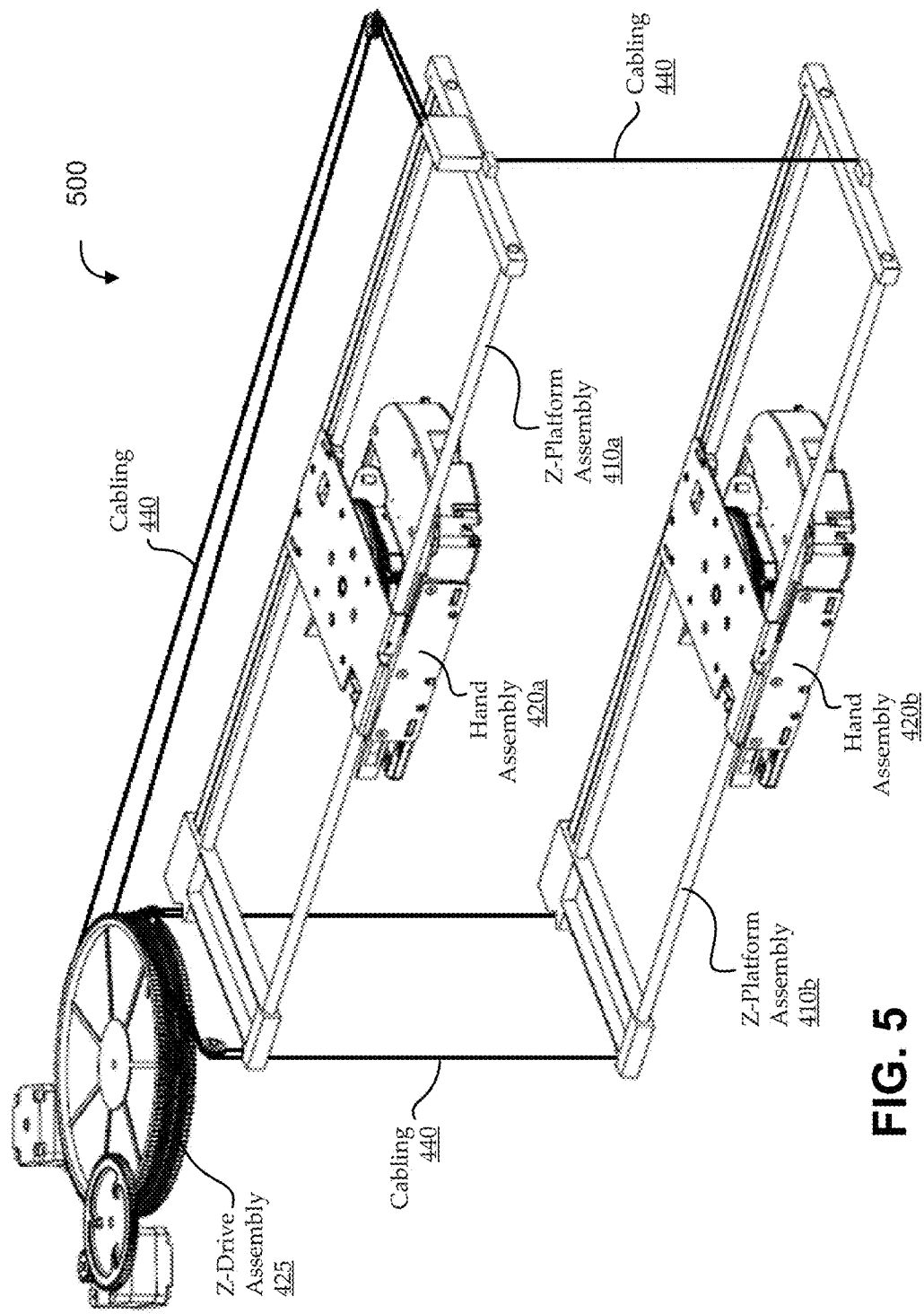
FIG. 5 shows a partial illustrative multi-robot CRU that has two Z-platform assemblies, each partially lowered, according to various embodiments.

FIG. 5 shows a partial illustrative multi-robot CRU 500 that has two Z-platform assemblies 410, each partially lowered, according to various embodiments. The illustrated Z-platform assemblies 410 are implemented as a carriage having a number of structural members (e.g., rails, supports, etc.), and are shown without certain components (e.g., respective X-drive assemblies 415) to avoid over-complicating the figure. As will be shown in more detail below, the Z-drive assembly 425 of the multi-robot CRU 500 includes motors and gearing that drive two bullwheels in a manner that can independently control the Z position of each Z-platform assembly 410. Each Z-platform assembly 410 is coupled with the bullwheel using a cable and pulley system. Certain implementations couple each Z-platform assembly 410 with its own cabling 440, but some of the pulley system (e.g., certain wheels, guides, etc.) can be shared by the two Z-platform assemblies 410. In the illustrated embodiment, cabling 440 is attached near each corner of one side and near the center of the other side of each Z-platform assembly 410, though other implementations can use different cabling 440 arrangements (e.g., like the four-corners arrangement illustrated in FIG. 4B). The cabling 440 passes through pulleys and wraps around respective bullwheels. Turning each bullwheel in one direction or the other adds slack to, or removes slack from, the cabling 440, causing each Z-platform assembly 410 to be raised or lowered.

Once in their desired Z-positions (or while moving to that position), each X-drive assembly 415 can be used to move a respective hand assembly 420 (e.g., along rails of the Z-platform assembly 410) to a desired X-location. Once in their desired X-Z-positions (or while moving to those positions), each hand assembly 420 can be turned (e.g., using wrist mechanisms) to desired rotational orientations (e.g., to face a cartridge slot or a media drive, to provide a desired angle for use of a sensor, etc.). If desired, a gripper mechanism may then be used to reach out (i.e., radially) from the X-Z-positions and rotational orientations (e.g., to grab or release a cartridge).

Independent and concurrent availability of multiple robotic assemblies can provide a number of features. One category of such features can increase throughput of the storage library. As one example, multiple robotic assemblies can be used to perform pick-and-place operations (e.g., moving a cartridge from a slot to a drive, etc.) on multiple cartridges concurrently. As another example, one robotic assembly of the multiple robotic assemblies can be used to perform a pick-and-place operation while another robotic assembly of the multiple robotic assemblies can be used to perform auditing or inventory functions (e.g., cataloging contents of slots, etc.). As another example, one robotic assembly of the multiple robotic assemblies can wait for un-mounting and unloading of a drive while another robotic assembly of the multiple robotic assemblies goes to retrieve a next cartridge. As another example, one robotic assembly of the multiple robotic assemblies can be used to load and/or unload cartridges to and/or from the mailslot 145 while another robotic assembly of the multiple robotic assemblies can be used to perform pick-and-place operations. Another category of such features can provide redundancy in the storage library. In one example, the multiple robotic assemblies allow one robotic assembly of the multiple robotic assemblies to be used, or to remain in use, when another robotic assembly of the multiple robotic assemblies becomes non-operational (e.g., electrically and/or mechanically).

Performance of these and other multi-robot functions can involve various types of contention systems (e.g., hardware and/or software). The contention systems can be used to avoid either or both of physical contentions (e.g., collisions between the multiple robotic assemblies, etc.) and logical contentions (e.g., directing multiple robotic assemblies to perform conflicting tasks or to perform tasks in an undesirable order, etc.). In performance of these functions, the contention systems can include any suitable sensing, feedback, and/or other functionality for real-time and/or predictive collision avoidance. In some implementations, contention functionality involves scheduling and/or queuing of tasks. For example, multiple pick-and-place operations can be queued, scheduled, and assigned to particular ones of the multiple robotic assemblies in such a way that avoids collisions between the multiple robotic assemblies and/or maximizes throughput (e.g., maximizes the number of operations that can be concurrently performed without physical or logical collision). In one illustrative scenario, a first cartridge is removed from a drive and a next cartridge is loaded in the drive. Without a contention system, it is likely that the first cartridge would be retrieved and put away into an appropriate magazine slot, after which the next cartridge would be retrieved and loaded into the drive. However, there may be no reason to wait to put away the first cartridge before loading the next. Accordingly, using contention techniques (e.g., appropriate task scheduling and collision avoidance), a first robotic assembly can wait for the drive to un-mount and can remove the first cartridge from the drive, while a second robotic assembly can retrieve the next cartridge. After removing the first cartridge, the first robotic assembly can move out of the way of the path of the second robotic assembly until the second robotic assembly has retrieved the next cartridge and has loaded the next cartridge into the drive. The two robotic assemblies can then move as appropriate to allow the first robotic assembly to put the first cartridge away into an appropriate magazine slot. This type of contention management can appreciably increase throughput. Many other types of contention management techniques can be used in other scenarios.

Figure 6A:
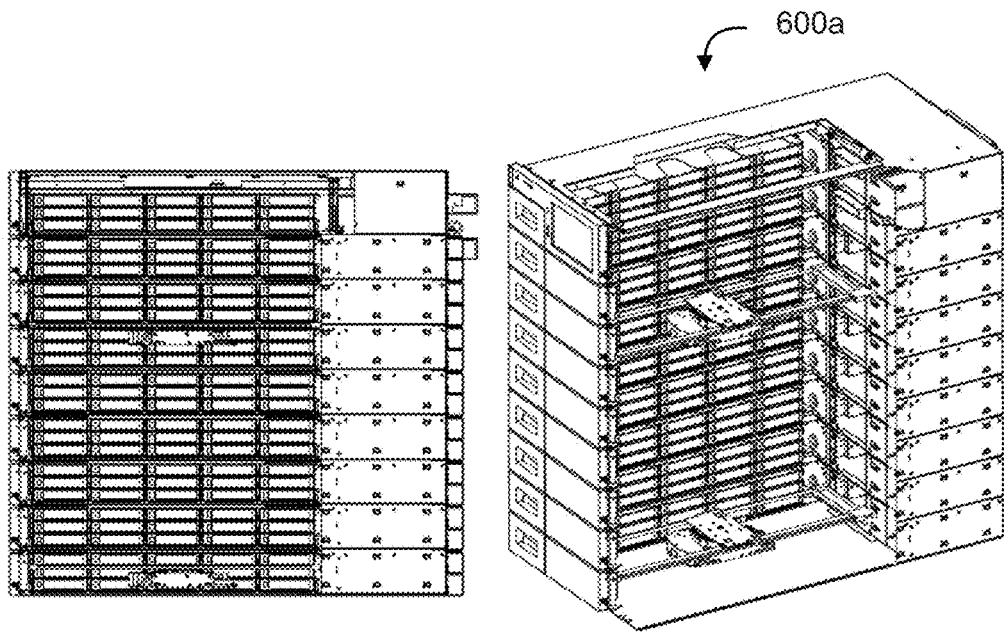
FIGS. 6A and 6B show views of an illustrative storage library environment having multiple robotic assemblies, according to various embodiments.
Figure 6B:
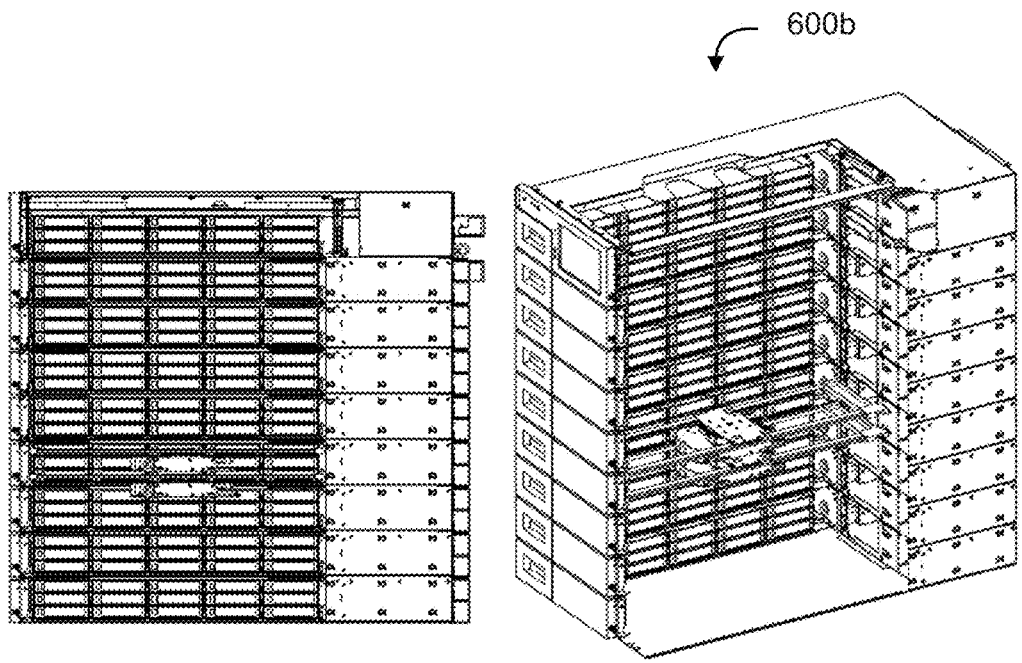

For the sake of added clarity, FIGS. 6A and 6B show views of an illustrative storage library environment 600 having multiple robotic assemblies, according to various embodiments. The storage library environment 600a of FIG. 6A has two robotic assemblies positioned in different portions of the storage library environment 600. For example, one robotic assembly is performing an operation in a bottom-most expansion module 120 of the storage library environment 600, while another is concurrently performing an operation in a higher expansion module 120 of the storage library environment 600. Alternatively, one robotic assembly is idle in a bottom-most expansion module 120 of the storage library environment 600 (e.g., kept out of the way until needed for redundancy purposes), while another is performing an operation in a higher expansion module 120 of the storage library environment 600. The storage library environment 600b of FIG. 6B has two robotic assemblies positioned vertically adjacent to each other in the storage library environment 600.

Figure 7:
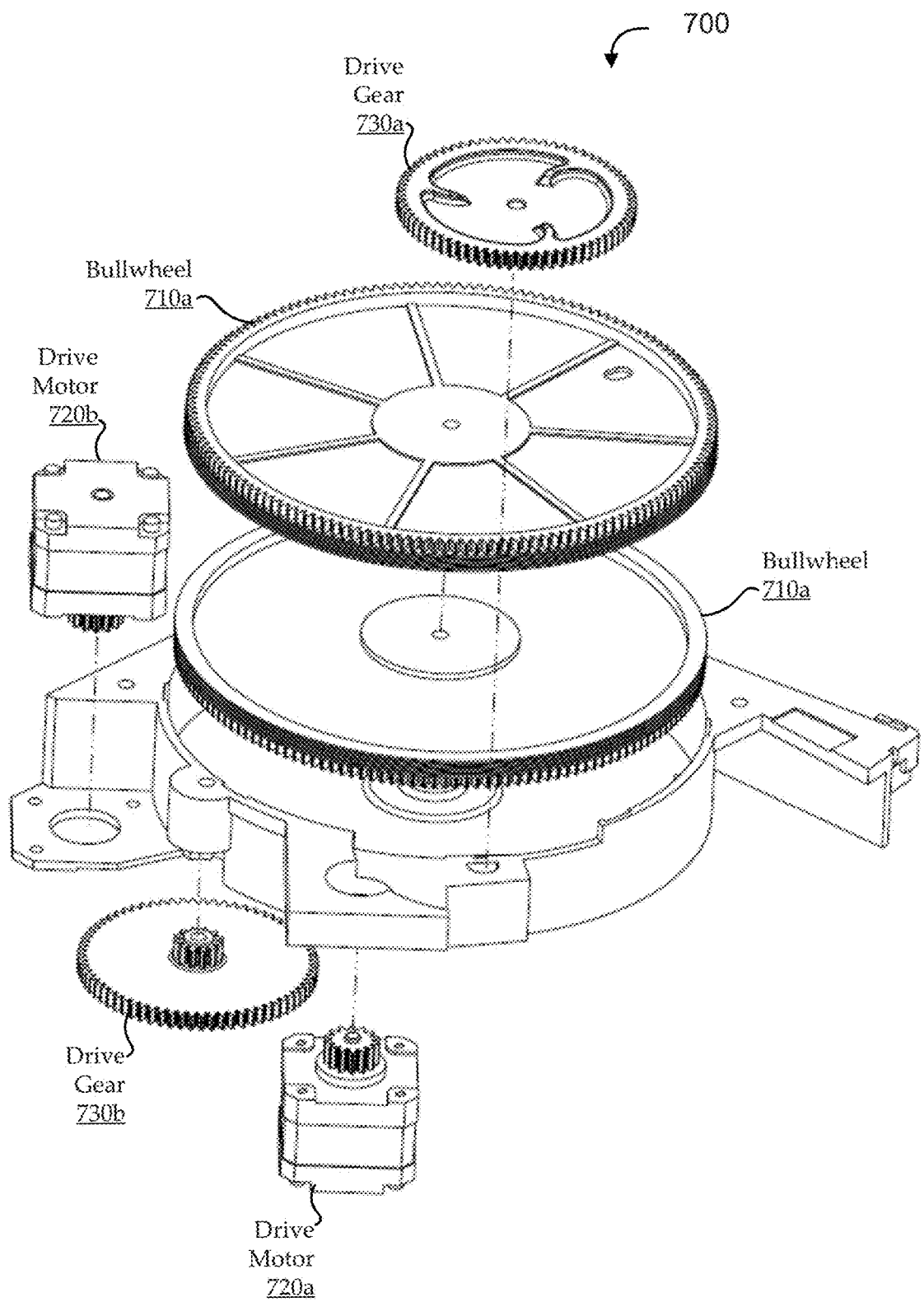
FIG. 7 shows an exploded view of an illustrative configuration of a partial Z-drive assembly for use with multiple robotic assemblies, according to various embodiments.

FIG. 7 shows an exploded view of an illustrative configuration of a partial Z-drive assembly 700 for use with multiple robotic assemblies, according to various embodiments. The partial Z-drive assembly 700 includes two drive sub-assemblies, each configured to independently control the Z position of a respective robotic assembly. For example, each sub-assembly includes a bullwheel 710, a drive motor 720, and a drive gear 730. Actuating a first drive motor 720a to turn in a direction, causes a first drive gear 730a to turn, which turns a first bullwheel 710a, thereby adding or taking up slack in cabling (not shown) wrapped around the bullwheel 710a. Actuating a second drive motor 720b to turn in a direction, causes a second drive gear 730b to turn, which turns a second bullwheel 710b, thereby adding or taking up slack in cabling (not shown) wrapped around the bullwheel 710b. In this way, one or more robotic assemblies coupled to the cabling of each bullwheel 710 can be independently moved in the Z direction.

Vertical Pass-Through Embodiments

Some storage libraries are configured to operate within particular dimensions. For example, as illustrated in FIG. 1, a storage library can be configured to fit in a standard equipment rack and may or may not be vertically expandable. The dimensions of the storage library can define a maximum amount of space that is available in the storage library for storing cartridges, media drives, and other types of components. For example, one illustrative configuration includes a base module 110 and three expansion modules 120, having eight magazines 140 with storage for fifteen cartridges each, and a mailslot 145 configured to hold up to five cartridges (i.e., space to store up to 125 cartridges total). As described above, some embodiments permit expansion modules 120 to be added to increase the size of the storage library.

However, some implementations have limited or no expandability. Accordingly, adding to the size of the library may involve purchasing an additional library. While the additional library can increase the total amount of available library space, it can also effectively segregate the library into two distinct environments. For example, a cartridge from one library cannot be used in the environment of the other library (e.g., moved to the other library, accessed via a media drive of the other library, etc.) when the two libraries are physically separate entities. As such, embodiments include vertical pass-through functionality to facilitate movement of a cartridge from one physical library environment into a vertically adjacent physical library environment.

Figure 8:
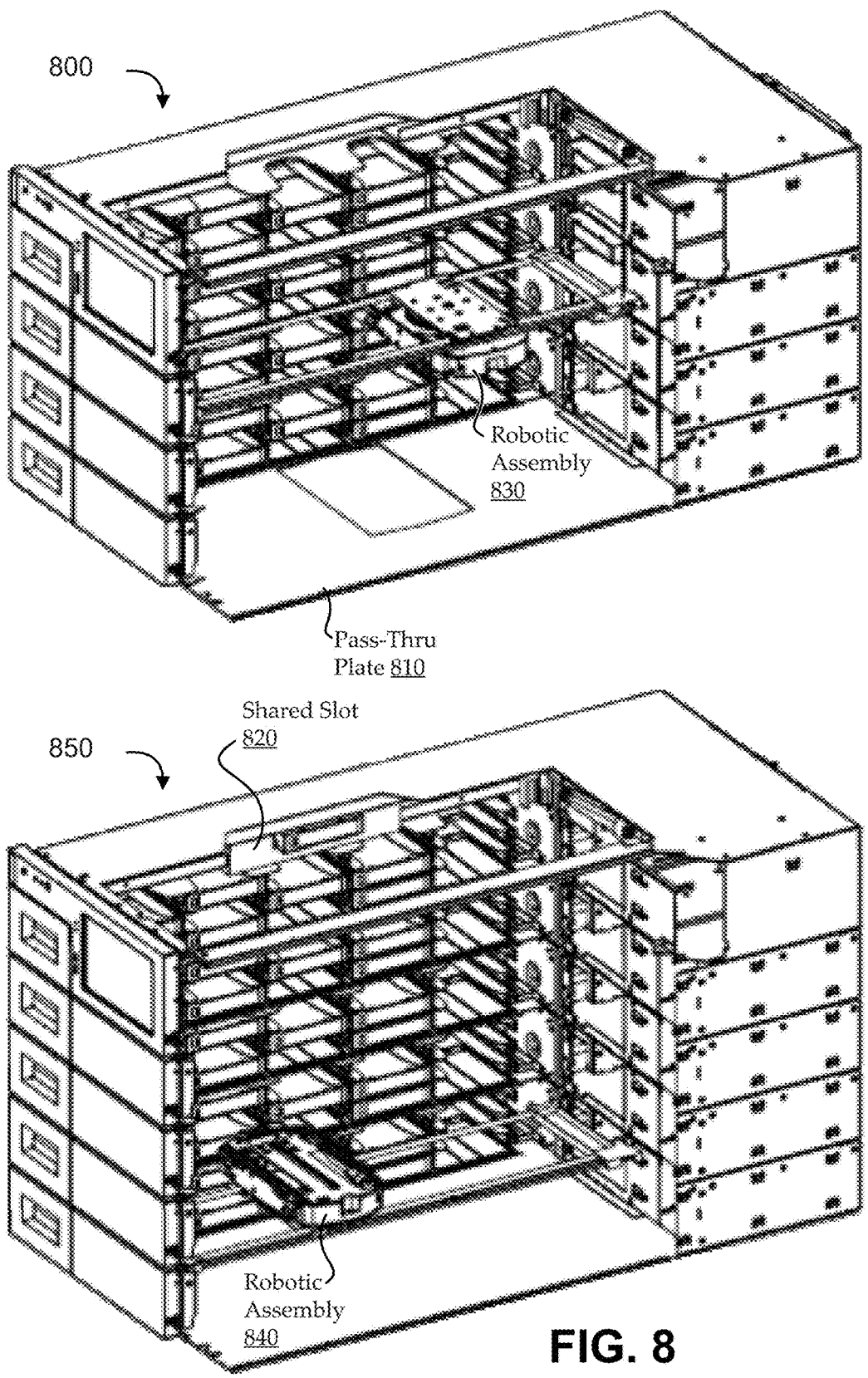
FIG. 8 shows an upper physical library environment and a lower physical library environment configured for vertical pass-through functionality, according to various embodiments.

FIG. 8 shows an upper physical library environment 800 and a lower physical library environment 850 configured for vertical pass-through functionality, according to various embodiments. For the sake of illustration, both physical library environments are shown as a base module and a set of expansion modules, similar to those described above. Similar techniques can be applied to other physical library environments without departing from the scope of embodiments.

The upper physical library environment 800 includes a pass-through plate 810 and a robotic assembly 830. The pass-through plate 810 and robotic assembly 830 can be configured in any manner that permits a hand of the robotic assembly 830 to drop below a bottom plane of the upper physical library environment via the pass-through plate 810. For example, as illustrated, the robotic assembly 830 is configured with its hand positioned below structure supporting the hand, and the pass-through plate 810 includes an opening large enough to allow the hand to drop through the opening.

The lower physical library environment 850 includes a shared slot 820 and a robotic assembly 840. The shared slot 820 is positioned in a manner that is accessible to both robotic assembly 840 (from the lower physical library environment 850) and to robotic assembly 830 (from the upper physical library environment 800 via the pass-through plate 810). For example, as illustrated, robotic assembly 840 is configured with its hand positioned above structure supporting the hand to facilitate the hand reaching the shared slot 820. In one implementation, the shared slot 820 is a single pass-through slot (e.g., similar or identical to a magazine slot) that simply acts as a way station for a passed cartridge. In another implementation, the shared slot 820 is one slot in a magazine of the lower physical library environment 850. In yet another implementation, the shared slot 820 is a slot of a media drive. For example, the media drive can be used directly by both physical library environments. This may be desirable, for example, when additional drives are desired, if the drive is a specialized or particularly expensive drive (i.e., permitting that drive to be shared by two libraries can save the end consumer cost). In still other implementations, the shared slot 820 can be any other suitable type of slot or mechanism for securing a passed cartridge in a manner that can be retrieved by either robotic assembly.

The illustrated configuration is only one of many possible implementations that fall within the scope of embodiments. According to another illustrative implementation, the lower physical library environment 850 includes the pass-through plate 810, the upper physical library environment 800 includes the shared slot 820, and robotic assembly 840 of the lower physical library environment 850 is configured to reach through the pass-through plate 810 to pick or place passed cartridges from or into the shared slot 820. According to yet another illustrative implementation, the pass-through plate 810 is not present, and the "floor" of the upper physical library environment 800 is effectively open for robotic assembly 830 to pass into the lower physical library environment 850 (e.g., or partially open in a manner different from the one illustrated). In some such implementations, the shared slot 820 can be a designated slot or any slot of any magazine or media drive of the lower physical library environment 850. In other such implementations, vertical pass-through functionality can be combined with certain multi-robot functionality described above. For example, contention techniques can be used to perform concurrent operations in the lower physical library environment 850 by using robotic assembly 840 only in the lower physical library environment 850 and using robotic assembly 830 in both physical library environments. According to still other implementations, one or both of the robotic assemblies can include additional mechanisms to allow the hand to reach further into another library environment. For example, in addition a wrist mechanism allowing the hand to rotate the wrist mechanism can also be configured to extend the hand away from its supporting structure to move further in the Z direction than the support structure would otherwise allow. Additional implementations can include moving only portions of the hand (e.g., only the gripper) in certain ways, tilting the hand, etc.

Figure 9B:
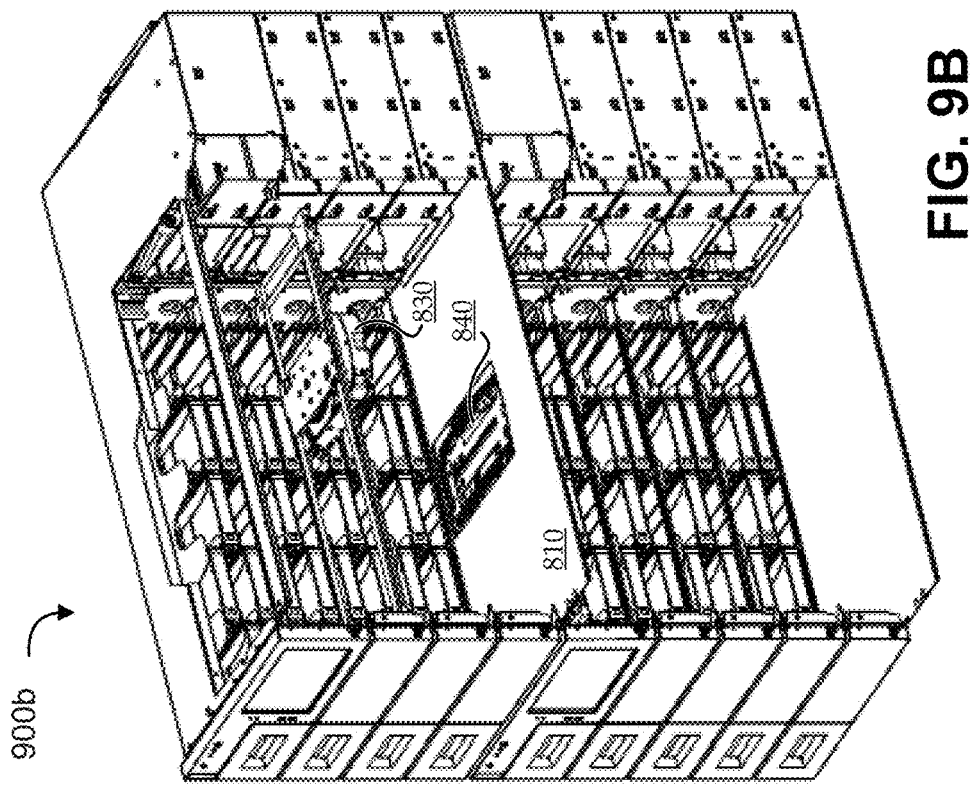
FIGS. 9A and 9B show vertical pass-through functionality in context of a stacked storage library environment, according to various embodiments.
Figure 9A:
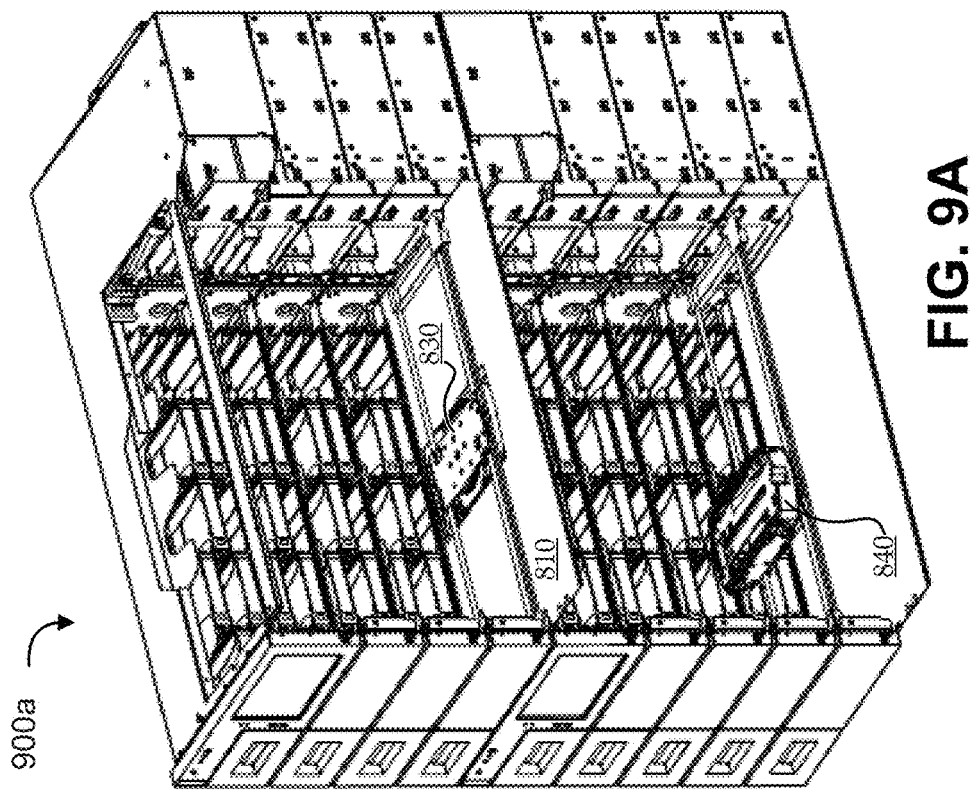

For the sake of added clarity, FIGS. 9A and 9B show vertical pass-through functionality in context of a stacked storage library environment 900, according to various embodiments. As illustrated, the upper physical library environment 800 is stacked on top of the lower physical library environment 850 with the opening of the pass-through plate 810 positioned directly over the shared slot 820. As described with reference to FIG. 8, this permits the robotic assembly 830 of the upper physical library environment 800 to effectively reach through the pass-through plate 810 in to the lower physical library environment 850 to facilitate pass-through functionality via the shared slot 820. FIG. 9A shows robotic assembly 830 reaching through the pass-through plate 810 opening to place a cartridge into the shared slot 820 (with robotic assembly 840 effectively moved out of the way or concurrently performing another operation). FIG. 9B shows robotic assembly 840 retrieving the cartridge from the shared slot 820 (with robotic assembly 830 effectively moved out of the way or concurrently performing another operation).

In addition to providing physical vertical pass-through functionality, some embodiments further include supporting logical functionality. In some implementations, host-level (or any other suitable level of) software is used to make at least one of the libraries aware of and capable of exploiting the shared slot 820. For example, each library is made aware of the shared slot 820 and is configured to utilize the shared slot to pass cartridges back and forth among the libraries. The supporting logical functionality can include notifying one or both libraries when a cartridge is present in the shared slot 820; providing a shared inventory of cartridges so that each library can be made aware of cartridges in both libraries; providing shared access to other resources (e.g., media drives); and/or any other suitable logical functionality.

Horizontal Pass-Through Embodiments

As described above, some storage libraries are configured to operate within particular dimensions, such as some or all of an equipment rack. Even storage libraries that are vertically expandable to take up the entire equipment rack, however, are limited by the overall dimensions of the equipment rack. For example, a standard equipment rack may support approximately six vertical feet of equipment (e.g., 42 standard rack units, where each rack unit is approximately 1.75-inches high). Referring generally to FIG. 1, a maximum configuration of an illustrative embodiment includes one base module 110 (supporting 35 cartridges) and nine expansion modules 120 (each supporting 30 cartridges), with a total height of "21 RU," or half of a standard equipment rack 130. Stacking two of these illustrative configurations into a single equipment rack supports a maximum of 610 cartridges.

To support additional cartridges, the environment may have to expand to a horizontally adjacent equipment rack, and some embodiments include horizontal pass-through functionality, accordingly. Implementing an effective horizontal pass-through can be difficult for a number of reasons. Passing from one vertical storage library to another may involve active horizontal pass-through mechanisms for physically ferrying a cartridge between the horizontally adjacent libraries. However, reliable ferrying can involve a number of considerations. One consideration is maintaining a stable pick and place environment that can be reliably accessed by the robotic mechanisms of each library environment. Another consideration is orienting the cartridge appropriately when passed. For example, each library environment may be configured so that cartridges are placed in slots facing in a particular direction (e.g., facing outward) to facilitate pick and place operations by their respective robotic assemblies. When passing from one side (e.g., the right side) of a first library to the opposite side (e.g., the adjacent left side) of a second library, the respective slot orientations may be different (e.g., 180-degrees different). Accordingly, it may be desirable for the horizontal pass-through mechanism to rotate the cartridge as appropriate during ferrying (e.g., or directly before or after ferrying).

Another consideration is accommodating different (and potentially shifting) horizontal separations between adjacent libraries. For the sake of illustration, FIGS. 10A and 10B show storage library environments 1000, each having storage libraries 1010 on respective, horizontally adjacent equipment racks 130. In FIG. 10A, the two equipment racks 130 are spaced very close together (as indicated by arrows 1020a). In FIG. 10B, the two equipment racks 130 are spaced farther apart (as indicated by arrows 1020b). In some environments, different equipment racks 130 are located at different horizontal spacings from each other (e.g., first and second equipment racks 130 are close together, while the second and a third are far apart). Further, in certain environments, the equipment rack 130 locations can shift slightly relative to each other, due, for example, to vibrations.

Figure 11:
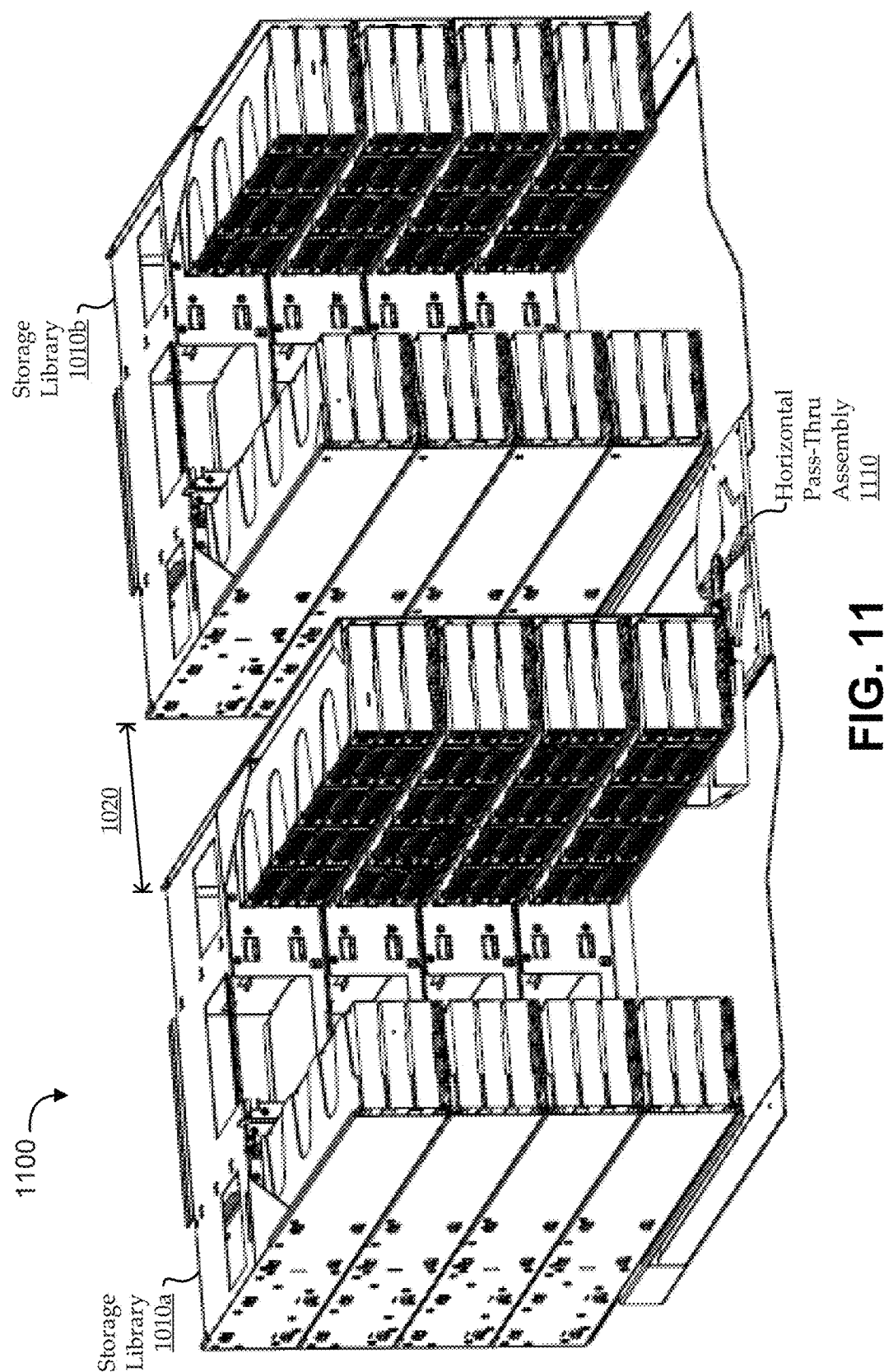
FIG. 11 shows a partial library environment having an illustrative horizontal pass-through assembly between two, horizontally adjacent storage libraries spaced apart by a horizontal span.

Accordingly, embodiments of horizontal pass-through assemblies described herein can accommodate multiple horizontal spacings. Further, as described below, some implementations accommodate multiple horizontal spacings with simple installation and little or no tooling. For example, FIG. 11 shows a partial library environment 1100 having an illustrative horizontal pass-through assembly 1110 between two, horizontally adjacent storage libraries 1010 spaced apart by a horizontal span 1020. The illustrative horizontal pass-through assembly 1110 is coupled with each storage library 1010 and includes a carriage for passing cartridges between the two libraries.

Figure 12A:
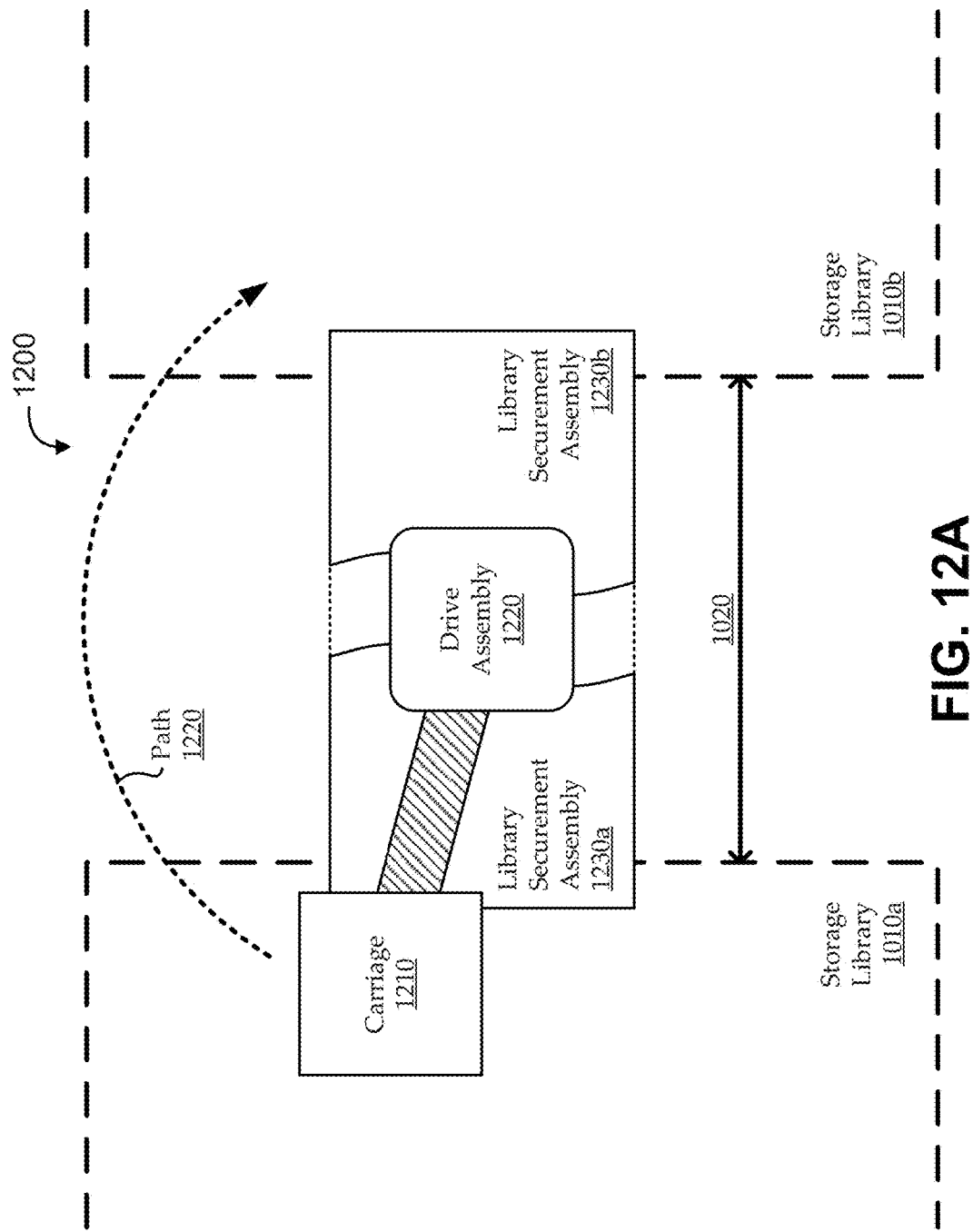
FIG. 12A shows a simplified block diagram of a horizontal pass-through assembly, according to various embodiments.

FIG. 12A shows a simplified block diagram of a horizontal pass-through assembly 1200, according to various embodiments. For the sake of context, two, horizontally adjacent storage libraries 1010 are shown, spaced apart by a horizontal span 1020. The horizontal pass-through assembly 1200 can be used as the horizontal pass-through assembly 1110 of FIG. 11. Embodiments of the horizontal pass-through assembly 1200 provide a number of functions. One function of embodiments of the horizontal pass-through assembly 1200 is to ferry cartridges securely from one storage library to a horizontally adjacent storage library. This can include ferrying from one secure pick-and-place location at one library to another secure pick-and-place location. This can also include reorienting (e.g., rotating) the cartridge, as appropriate, for use by each library. Another function of embodiments of the horizontal pass-through assembly 1200 is to easily adjust to a range of horizontal spacings.

The horizontal pass-through assembly 1200 includes a library securement assembly 1230 comprising a first portion configured to physically couple with the first storage library 1010*a* at a first side of the library securement assembly 1230, and a second portion configured to physically couple with the second storage library 1010*b* at a second side of the library securement assembly 1230, in such a way that a horizontal span between the first and second portions can be adjusted over a defined range of possible horizontal spans 1020 between the storage libraries 1010. The horizontal pass-through assembly 1200 also includes a carriage 1210 configured to receive a media cartridge and a drive assembly 1220. The drive assembly 1220 couples the carriage 1210 with the library securement assembly 1230. Embodiments of the drive assembly 1220 actively drive the carriage 1210 between first and second pick-and-place locations at respective sides of the library securement assembly 1230 along a path 1220 that dynamically complies with (i.e., accommodates) the horizontal span between the first and second portions of the library securement assembly 1230. In some embodiments, the drive assembly 1230 includes components to electrically (e.g., communicatively) couple the horizontal pass-through assembly 1200 with one or more storage libraries 1010. Certain embodiments further include additional components, like processors and/or any other suitable component.

Figure 12B:
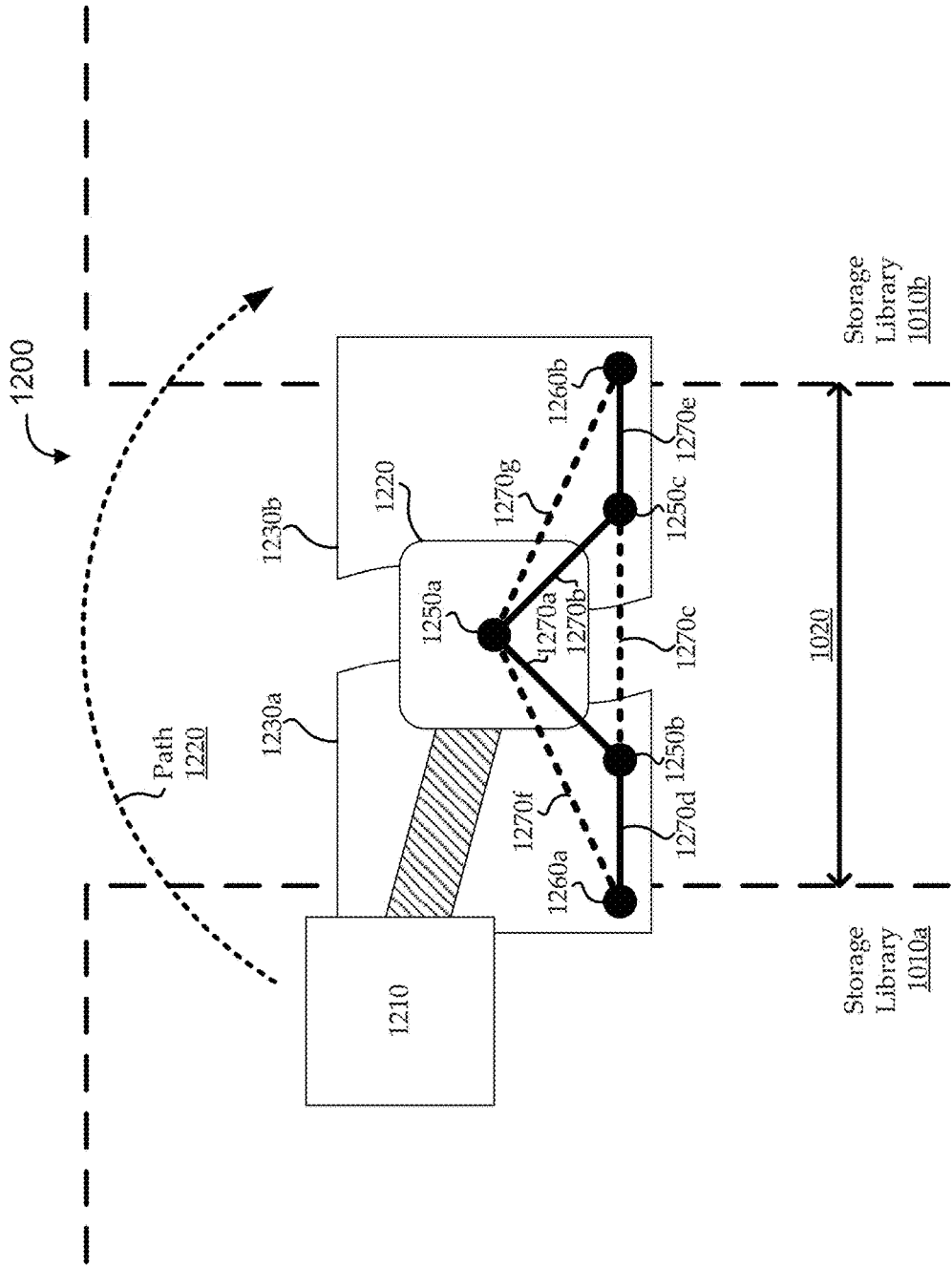
FIG. 12B shows another view of the horizontal pass-through assembly of FIG. 12A, to illustrate certain features of some implementations.

FIG. 12B shows another view of the horizontal pass-through assembly 1200 of FIG. 12A, to illustrate certain features of some implementations. As described above, embodiments include a drive assembly 1220 that actively drives the carriage 1210 between first and second pick-and-place locations at respective sides of the library securement assembly 1230. As illustrated, the drive assembly 1220 can include a first pivot location 1250*a* around which the carriage is driven (e.g., in an arc or along any suitable path, for example, as described below). The first pivot location 1250*a* can, for example, be the central axis of a drive gear or implemented in any other suitable fashion. The first portion of the library securement assembly 1230*a* can be configured to physically couple with the first storage library 1010*a* in such a way that defines a second pivot location 1250*b* that is coupled with the first pivot location 1250*a* and separated from the first pivot location 1250*a* by a first distance 1270*a*. The second portion of the library securement assembly 1230*b* is configured to physically couple with the second storage library 1010*b* in such a way that defines a third pivot location 1250*c* that is coupled with the first pivot location 1250*a* and separated from the first pivot location 1250*a* by a second distance 1270*b*. The second pivot location 1250*b* and the third pivot location 1250*c* are separated by a third distance 1270*c* that is defined by the horizontal span 1020, such that, as the horizontal span 1020 is adjusted, the third distance 1270*c* changes accordingly, and the first and second distances (1270*a* and 1270*b*) remain substantially static. In some implementations, the first and second distances (1270*a* and 1270*b*) are substantially equal, so that the path 1220 dynamically complies to accommodate the horizontal span 1020 between the first and second portions by maintaining the first pivot location 1250*a* substantially centered between the second and third pivot locations (1250*b* and 1250*c*) regardless of the horizontal span 1020. For example, the first, second, and third distances (1270*a*, 1270*b*, and 1270*c*) can form an isosceles triangle. In other implementations, the first and second distances (1270*a* and 1270*b*) can be adjusted (e.g., manually) to accommodate differences in library installations, for fine adjustment of the assembly, etc.

In some implementations, when the first portion is coupled with the first storage library 1010*a*, the second pivot location 1250*b* is separated from the first pick-and-place location (e.g., and/or from a particular library installation feature or other suitable location) by a fourth distance 1270*d*, so that the first and fourth distances (1270*a* and 1270*d*) form two sides of a first triangle. When the second portion is coupled with the second storage library 1010*b*, the third pivot location 1250*c* is separated from the second pick-and-place location (e.g., or other suitable location) by a fifth distance 1070*e*, so that the second and fifth distances (1270*b* and 1270*e*) form two sides of a second triangle. In such implementations, the first pivot location 1250*a* can be coupled with each of the second and third pivot locations (1250*b* and 1250*c*) in such a way that the third side of the first triangle 1070*f* and the third side of the second triangle 1070*g* are substantially equal in length regardless of the horizontal span 1020. For example, this permits the first pivot location 1250*a* (e.g., the central axis that defines the path 1220 over which the carriage 1210 travels) to dynamically comply with changes in the horizontal span 1020.

Figure 13:
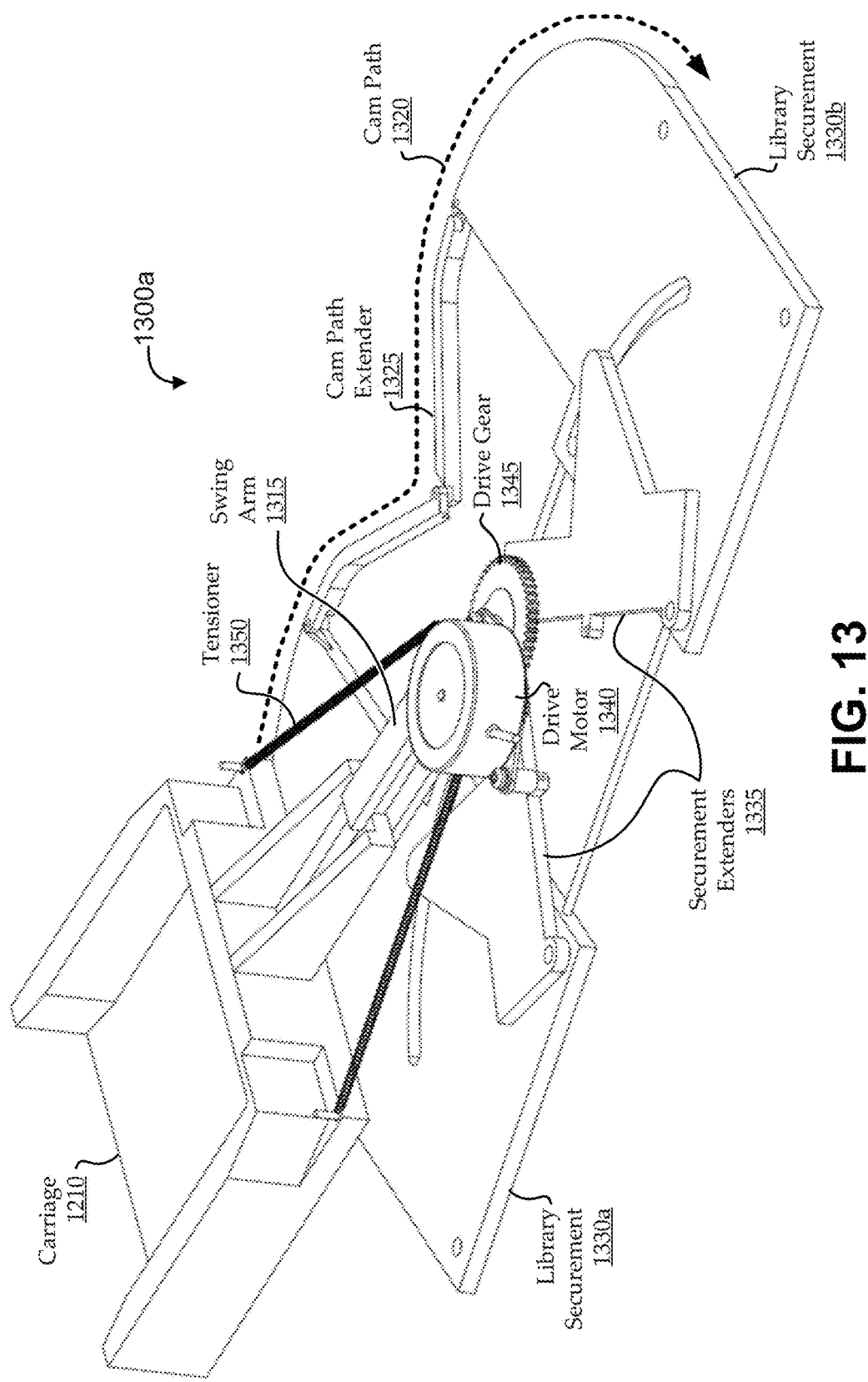
FIG. 13 shows a first view of an illustrative implementation of a horizontal pass-through assembly, according to various embodiments.
Figure 14:
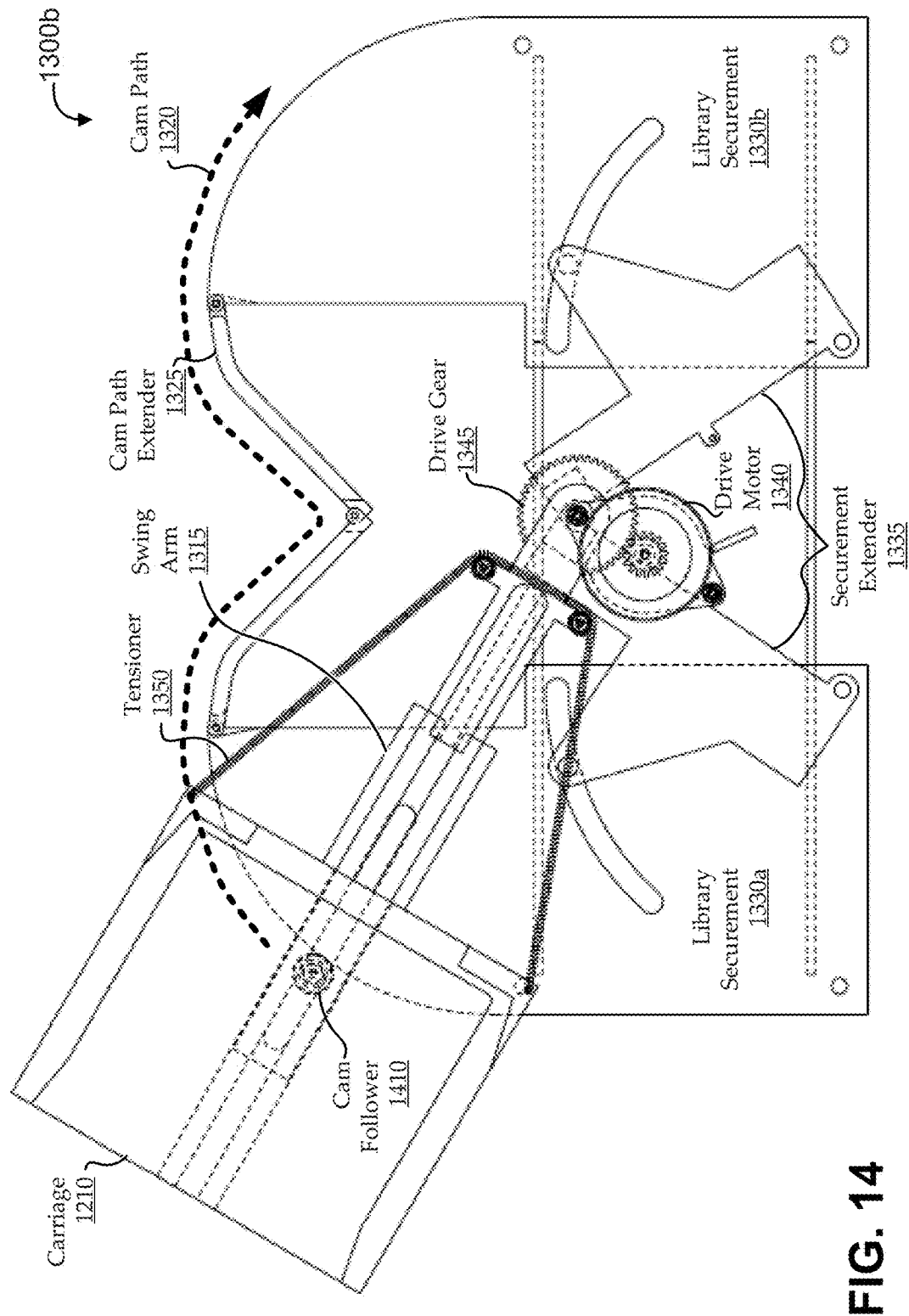
FIG. 14 shows a second view of the illustrative implementation of a horizontal pass-through assembly of FIG. 13, according to various embodiments.

FIGS. 13 and 14 show two views of an illustrative implementation of a horizontal pass-through assembly 1300, according to various embodiments. Embodiments of the horizontal pass-through assembly 1300 include structure shaped to provide a cam path 1320, which the carriage 1210 can follow to travel from one storage library on one side of the horizontal pass-through assembly 1300 to another storage library on the other side of the horizontal pass-through assembly 1300. As illustrated, the horizontal pass-through assembly 1300 can couple with each of two storage libraries using respective library securements 1330. For example, each library securement 1330 includes securing structure (e.g., holes, pins, thumb screws, hooks, magnets, or any other suitable elements) for securing the respective library securement 1330 to one or more features of the respective storage library. Various types of securement extenders 1335 can be included to permit expansion of the horizontal pass-through assembly 1300 into various horizontal spacings. In some implementations, a cam path extender 1325 is included to extend the cam path 1320 to accommodate horizontal expansion of the horizontal pass-through assembly 1300. For example, as illustrated, edges of the library securements 1330 and the cam path extender 1325 can together effectively define the cam path 1320.

According to some embodiments, the carriage 1210 is coupled with a swing arm 1315 and a tensioner 1350 (e.g., a spring or other suitable device for providing constant or adjustable tension). A cam follower 1410 (visible in FIG. 14) can be designed to ride along the cam path 1320 (e.g., along certain edges of the library securements 1330 and the cam path extender 1325. The swing arm 1315 and the tensioner 1350 can extend to allow the cam follower 1410 to ride along the cam path 1320 in tension, even as a distance between an axis of rotation of the swing arm 1315 and the cam path 1320 changes. In some implementations, a drive motor 1340 is coupled with the swing arm 1315 via a drive gear 1345, so that actuation of the drive motor 1340 can turn the drive gear 1345, thereby swinging the swing arm 1315 and the carriage 1210 from one side of the horizontal pass-through assembly 1300 to the other side of the horizontal pass-through assembly 1300 along the cam path 1320.

The embodiment shown in FIGS. 13 and 14 is intended to illustrate one possible implementation, but many different variations can be made without departing from the scope of other embodiments. For example, the illustrated embodiment provides means for ferrying cartridges securely from one storage library to a horizontally adjacent storage library by receiving a cartridge in the carriage 1210 and swinging the carriage 1210 about the cam path 1320. Other embodiments can include any suitable carriage means for securely receiving one or more cartridges, any suitable means for moving the carriage means from one side of the horizontal pass-through assembly 1300 to the other, any suitable cam path 1320, any suitable means for causing the carriage means to follow the cam path 1320, etc. Further, the illustrated embodiment reorients the cartridge as it is ferried from one side of the horizontal pass-through assembly 1300 to the other by swinging the carriage 1210 around an axis. Other embodiments can include any suitable means for reorienting the cartridge, including any active and/or passive means for rotating the cartridge and/or the carriage 1210 before, during, and/or after ferrying of the cartridge from one side of the horizontal pass-through assembly 1300 to the other. Even further, the illustrated embodiment adjusts to a range of horizontal spacings using a number of components, including securement extenders 1335, the cam path extender 1325, the extendable swing arm 1315, and the extendable tensioner 1350. Other embodiments include other means for maintaining a usable cam path 1320 and means for maintaining the axis of rotation of the swing arm 1315 in a substantially proportionally fixed location with respect to the overall horizontal span of the horizontal pass-through assembly 1300 (e.g., substantially in the center) as the horizontal span of the horizontal pass-through assembly 1300 is adjusted. Still other embodiments e.g., that do not use the same arrangement of swing arm 1315 and cam path 1320 can include any other suitable means for extending the horizontal span of the horizontal pass-through assembly 1300 in the context of their respective carriage means, etc.

Additionally, some implementations can automatically adjust to an appropriate horizontal span. For example, FIGS. 13 and 14 show an embodiment having library securements 1330 that can be manually pulled apart to accommodate different horizontal spans between storage libraries. Alternate embodiments can include motorized, spring-loaded, or otherwise automatic expansion functionality. In one implementation, an additional motor is provided to drive active securement extenders 1335. When installing the horizontal pass-through assembly 1300, for example, a first side (e.g., a first library securement 1330) is secured to features of one storage library. The additional motor can then be activated to drive the active securement extenders 1335 across the span until the other library is reached, at which point the other library securement 1330 can either be manually secured, automatically secured, held in place by tension, etc.

Figure 15A:
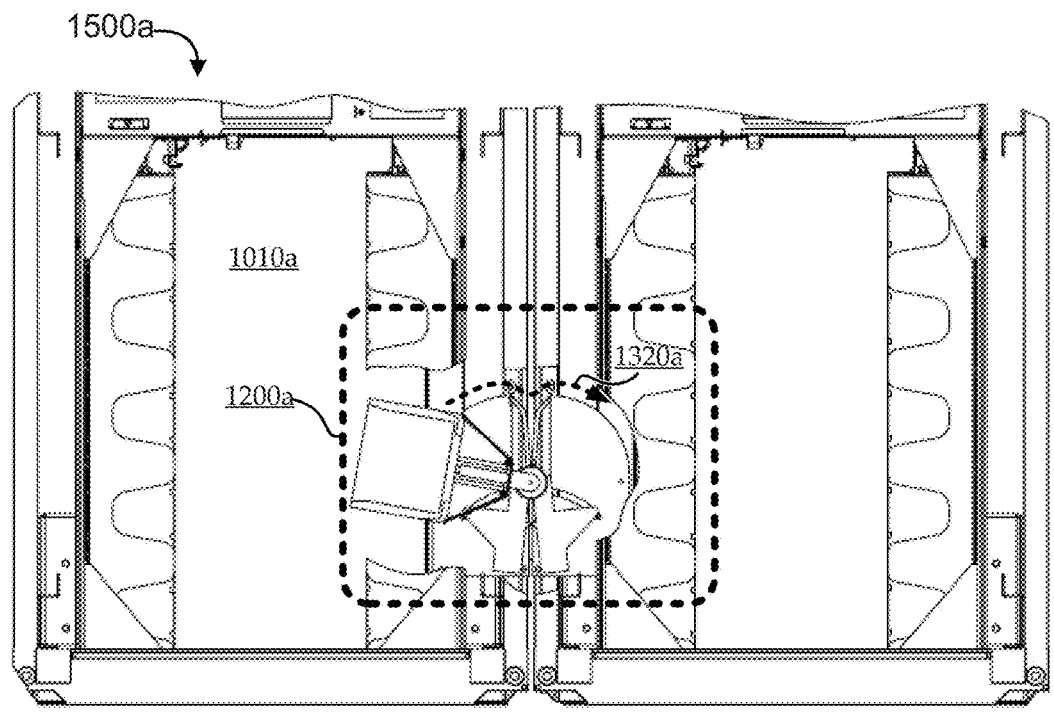
FIGS. 15A and 15B show views of a horizontal pass-through assembly installed in an illustrative library environment.
Figure 15B:
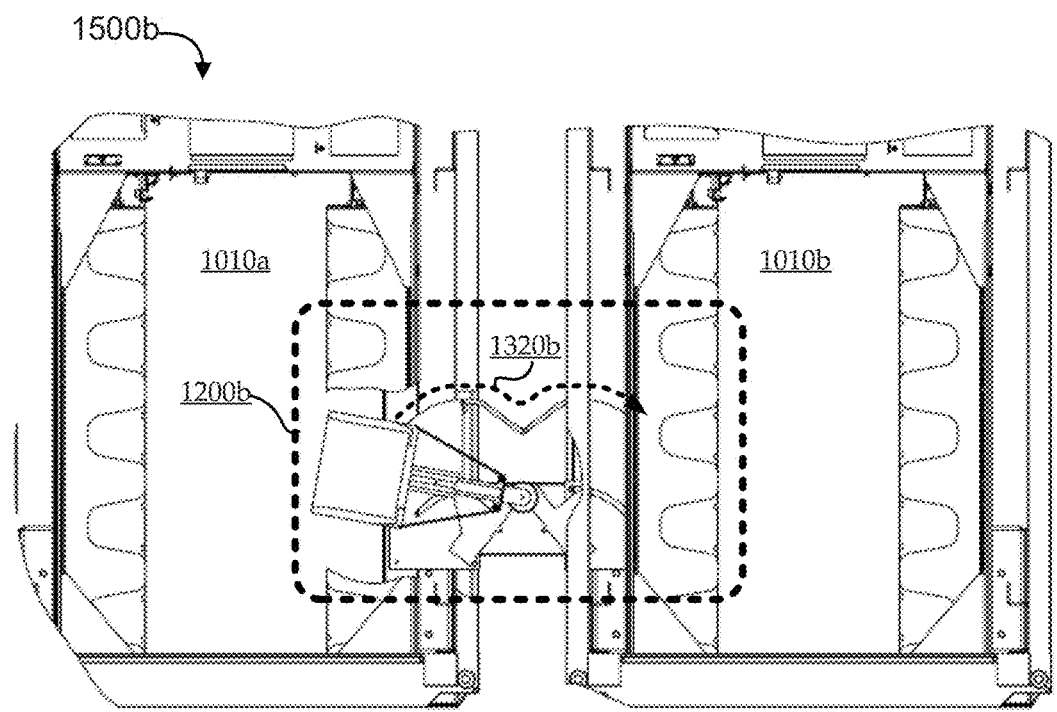

For the sake of further illustration, FIGS. 15A and 15B show views 1500 of a horizontal pass-through assembly 1200 installed in an illustrative library environment. Each view is a cut-away view looking down on the library environment, so that a portion of the structure and a portion of a storage magazine for each of two, horizontal storage libraries 1010 provide context. In FIG. 15A, the two storage libraries 1010 are positioned close together, and the horizontal pass-through assembly 1200a is horizontally compacted to fit the close spacing. In FIG. 15B, the two storage libraries 1010 are positioned farther apart, and the horizontal pass-through assembly 1200b is horizontally expanded to fit the larger spacing. In both of FIGS. 15A and 15B, an associated cam path 1320 is shown to illustrate that the cam path adjusts along with the adjustments to the horizontal span of the horizontal pass-through assembly 1200.

Figure 16:
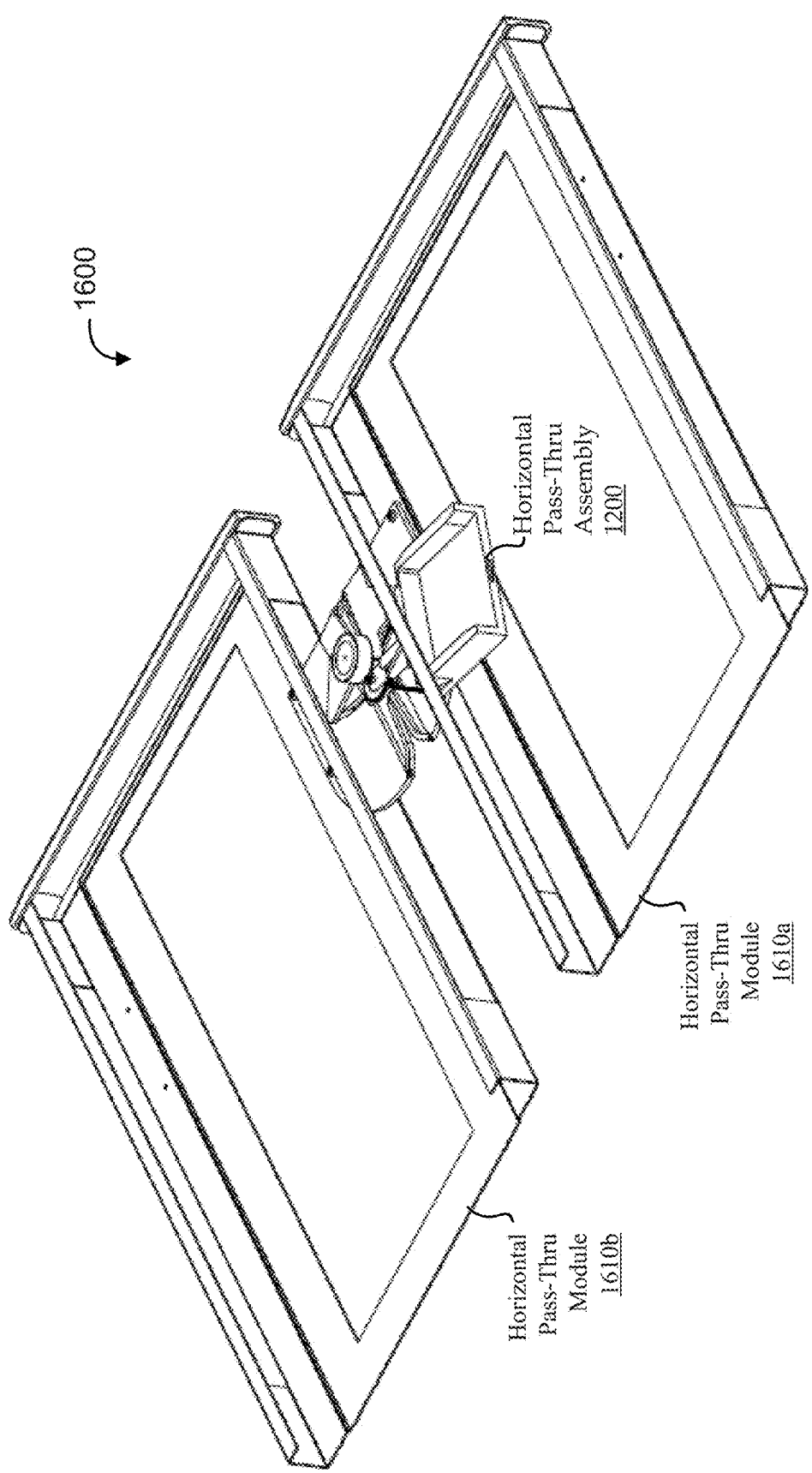
FIG. 16 shows an installation that includes a dedicated horizontal pass through module that can be added to each storage library.

The horizontal pass-through assembly 1200 can be installed in the library environment in any suitable manner. For example, FIG. 16 shows an installation 1600 that includes a dedicated horizontal pass through module 1610 that can be added to each storage library. The horizontal pass through module 1610 can include mounting locations for coupling with library securements of the horizontal pass-through assembly 1200 and an opening to permit movement of the horizontal pass-through assembly 1200 carriage (e.g., to allow the swing arm to swing around its axis). The opening can be sized to facilitate different amounts of movement for different horizontal spacings. For example, in the configuration of horizontal pass-through assembly 1300 illustrated in FIGS. 13 and 14, the swing radius may increase as the horizontal span of the assembly increases. Certain implementations of the horizontal pass through modules 1610 can also include additional features, such as an open vertical pathway (e.g., no top structure and an open bottom structure, as illustrated) to facilitate vertical movement of a robotic mechanism through the horizontal pass through module 1610 to expansion modules below. In some implementations, the horizontal pass through module 1610 can be part of an expansion module; can include or support one or more magazines, additional cartridge storage slots, or drives; etc.

In addition to providing physical horizontal pass-through functionality, some embodiments further include supporting logical functionality. In some implementations, host-level (or any other suitable level of) software is used to make the libraries aware of and capable of exploiting the horizontal pass-through assembly and/or module. This can include electrically coupling one or both libraries (e.g., their respective main processors) to the horizontal pass-through assembly to allow one or both libraries to control the drive motor and/or other functions of the horizontal pass-through assembly. Other supporting logical functionality can include notifying one or both libraries when a cartridge is delivered to and/or received from the horizontal pass-through assembly; providing a shared inventory of cartridges so that each library can be made aware of cartridges in both libraries; providing shared access to other resources (e.g., media drives); and/or any other suitable logical functionality.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A vertical pass-through system comprising:
   a storage library including:
      a first access zone comprising a first plurality of media slot locations; and
      a second access zone comprising a second plurality of media slot locations that includes a shared slot structurally fixed to remain within the second access zone, said second access zone being distinct from, and vertically adjacent to, said first access zone;
   a first robotic assembly that operates to first ferry a storage medium between any of said first plurality of media slot locations in said first access zone and said shared slot in said second access zone; and
   a second robotic assembly that operates to second ferry said storage medium between said shared slot in said second access zone and another of said second plurality of media slot locations in said second access zone.

2. The vertical pass-through system of claim 1, wherein said first access zone comprises a support structure configured to support and position said first robotic assembly in said first ferrying.

3. The vertical pass-through system of claim 2, wherein said first robotic assembly is disposed below said support structure.

4. The vertical pass-through system of claim 1, wherein said second access zone comprises a support structure configured to support and position said second robotic assembly in said second ferrying.

5. The vertical pass-through system of claim 4, wherein said second robotic assembly is disposed above said support structure.

6. The vertical pass-through system of claim 1, wherein said shared slot is selected from the group consisting of: a way station slot and a media drive slot.

7. The vertical pass-through system of claim 6, wherein each of said first access zone and said second access zone are in operative communication with said media drive slot.

8. The vertical pass-through system of claim 1, further comprising:
   a physical boundary that segregates said first access zone from said second access zone, wherein said physical boundary comprises a pass-through plate that defines an opening through which at least a portion of said first robotic assembly travels during said first ferrying.

9. The vertical pass-through system of claim 1, wherein said second access zone is disposed below said first access zone.

10. The vertical pass-through system of claim 1, wherein said first access zone is disposed below said second access zone.

11. The vertical pass-through system of claim 1, wherein at least one of said first plurality of media slot locations includes a shared slot, and wherein said second robotic assembly operates to third ferry said storage medium between any of said second plurality of media slot locations and said shared slot of said first access zone.

12. The vertical pass-through system of claim 1, further comprising:
    a drive control subsystem that is in operative communication with each of said first access zone and said second access zone to:
       detect completion of said first ferrying; and
       initiate, in accordance with said detection, said second ferrying.

13. A method for vertical pass-through of storage media in a storage library, the method comprising:
first ferrying, using a first robotic assembly, a storage medium from any of a first plurality of media slot locations to a shared slot, said first plurality of media slot locations being disposed in a first access zone of a storage library, and said shared slot being one of a second plurality of media slot locations disposed in a second access zone of said storage library, said second access zone being distinct from, and vertically adjacent to, said first access zone; and
second ferrying, using a second robotic assembly, subsequent to completion of said first ferrying, said storage medium from said shared slot to another of said second plurality of media slot locations,
wherein the shared slot remains structurally fixed within the second access zone throughout the first and second ferrying.

14. The method of claim 13, wherein said first ferrying comprises passing at least a portion of said first robotic assembly through an opening defined by a pass-through plate that physically segregates said first access zone from said second access zone.

15. The method of claim 13, wherein said first ferrying comprises moving at least a portion of said first robotic assembly downward from said first access zone to said second access zone.

16. The method of claim 13, wherein said first ferrying comprises moving at least a portion of said first robotic assembly upward from said first access zone to said second access zone.

17. The method of claim 13, wherein:
said shared slot is selected from the group consisting of: a way station slot and a media drive slot; and
said media drive slot is in operative communication with each of said first access zone and said second access zone.

18. A method for increasing capacity of a storage library, the method comprising:
physically coupling a second access zone with a first access zone for vertical adjacent attachment, said second access zone being distinct from said first access zone, wherein said first access zone comprises a first robotic assembly and a first plurality of media slot locations, and wherein said second access zone comprises a second robotic assembly and a second plurality of media slot locations that includes a shared slot; and
configuring said first robotic assembly and said second robotic assembly for coordinated ferrying of a storage medium between any of said first plurality of media slots and another of said second plurality of media slots via said shared slot, the shared slot remaining structurally fixed within the second access zone throughout the ferrying.

19. The method of claim 18, further comprising:
establishing an operative communication link between a drive control subsystem and each of said first access zone and said second access zone for said coordinated ferrying.

20. The method of claim 18, where said coordinated ferrying comprises:
first operating said first robotic assembly to first ferry said storage medium between said any of said first plurality of media slot locations and said shared slot; and
second operating said second robotic assembly to second ferry said storage medium between said shared slot and said another of said second plurality of media slot locations.

* * * * *

UNITED STATES PATENT AND TRADEMARK OFFICE
CERTIFICATE OF CORRECTION

PATENT NO. : 9,715,894 B2
APPLICATION NO. : 14/639900
DATED : July 25, 2017
INVENTOR(S) : Ostwald et al.

Page 1 of 1

It is certified that error appears in the above-identified patent and that said Letters Patent is hereby corrected as shown below:

In Column 1, Line 22, delete "(JO)" and insert -- (I/O) --, therefor.

In Column 5, Line 10, delete "and or" and insert -- and/or --, therefor.

In Column 6, Line 5, delete "and or" and insert -- and/or --, therefor.

In Column 17, Line 33, delete "e.g.," and insert -- (e.g., --, therefor.

In Column 17, Line 35, delete "1320" and insert -- 1320) --, therefor.

Signed and Sealed this
Thirteenth Day of February, 2018

Andrei Iancu
*Director of the United States Patent and Trademark Office*